(12) United States Patent
Kusumoto et al.

(10) Patent No.: US 8,914,222 B2
(45) Date of Patent: Dec. 16, 2014

(54) ELECTRONIC CONTROL UNIT OF INTERNAL COMBUSTION ENGINE

(71) Applicant: DENSO CORPORATION, Kariya (JP)

(72) Inventors: Takahito Kusumoto, Kariya (JP); Toru Itabashi, Anjo (JP); Kenji Mochizuki, Chita-gun (JP); Yuki Mikami, Kariya (JP); Yoshiharu Takeuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 13/693,134

(22) Filed: Dec. 4, 2012

(65) Prior Publication Data
US 2013/0151116 A1 Jun. 13, 2013

(30) Foreign Application Priority Data

Dec. 12, 2011 (JP) ................... 2011-271765

(51) Int. Cl.
| | | |
|---|---|---|
| G06F 19/00 | (2011.01) | |
| G06G 7/70 | (2006.01) | |
| F02D 45/00 | (2006.01) | |
| F02D 41/28 | (2006.01) | |
| F02P 5/152 | (2006.01) | |
| F02D 35/02 | (2006.01) | |

(52) U.S. Cl.
CPC ............... *F02D 45/00* (2013.01); *F02D 41/28* (2013.01); *F02P 5/152* (2013.01); *F02D 35/027* (2013.01); *F02D 2041/281* (2013.01); *Y02T 10/46* (2013.01)
USPC . 701/111; 701/102; 123/406.21; 123/406.35; 73/35.01

(58) Field of Classification Search
CPC ............... H03M 1/12; F02D 35/027
USPC .......... 123/435, 494, 406.21, 406.29, 406.34, 123/406.37, 406.38, 406.39; 701/102, 111; 73/35.01, 35.03, 35.04, 35.07–35.13; 341/118, 120, 122, 155
See application file for complete search history.

(56) References Cited

U.S. PATENT DOCUMENTS

| | | | | |
|---|---|---|---|---|
| 5,083,278 | A | * | 1/1992 | Matsuura ....................... 701/111 |
| 5,088,044 | A | * | 2/1992 | Matsuura ....................... 701/111 |
| 5,205,258 | A | | 4/1993 | Hashimoto et al. |
| 5,339,245 | A | | 8/1994 | Hirata et al. |
| 5,736,896 | A | | 4/1998 | Sakishita et al. |
| 5,905,193 | A | | 5/1999 | Hashizume et al. |
| 6,445,320 | B1 | | 9/2002 | Noro et al. |

(Continued)

FOREIGN PATENT DOCUMENTS

| | | |
|---|---|---|
| JP | 63-186949 A | 8/1988 |
| JP | 64-045966 A | 2/1989 |

(Continued)

*Primary Examiner* — Thomas Moulis
*Assistant Examiner* — Joseph Dallo
(74) *Attorney, Agent, or Firm* — Posz Law Group, PLC

(57) ABSTRACT

An electronic control unit (ECU), for use with an internal combustion engine, determines whether an abnormal combustion has occurred in the engine. The ECU uses a sensor signal amplifier to amplify a sensor signal from a sensor by changing an amplification power of the sensor signal and an A/D converter to convert the sensor signal amplified to a digital signal (i.e., a digitized sensor signal). The ECU uses an abnormal combustion detector to determine whether an abnormal combustion has occurred based on a characteristic of a waveform of the digitized sensor signal, and performs an abnormal combustion prevention control to prevent the abnormal combustion when an abnormal combustion is detected. An amplification controller is used to set the amplification power of the sensor signal amplifier based on the amplitude of the digitized sensor signal and a determination result of the abnormal combustion by the abnormal combustion detector.

20 Claims, 17 Drawing Sheets

(56) References Cited

U.S. PATENT DOCUMENTS

| | | | |
|---|---|---|---|
| 7,310,575 B2* | 12/2007 | Honda | 701/111 |
| 2006/0136117 A1 | 6/2006 | Kaneko et al. | |
| 2011/0030452 A1* | 2/2011 | Dierssen et al. | 73/35.01 |
| 2013/0060451 A1* | 3/2013 | Itou et al. | 701/104 |

FOREIGN PATENT DOCUMENTS

| | | |
|---|---|---|
| JP | 04-224260 A | 8/1992 |
| JP | 5-340331 A | 12/1993 |
| JP | 06-280668 A | 10/1994 |
| JP | 7-306119 A | 11/1995 |
| JP | 07-310584 A | 11/1995 |
| JP | 08-121234 A | 5/1996 |
| JP | 9-112333 A | 4/1997 |
| JP | 9-229823 A | 9/1997 |
| JP | 11-050904 A | 2/1999 |
| JP | 11-163731 A | 6/1999 |

* cited by examiner

FIG. 3

| PEAK VALUE Dp \ KNOCK DETERMINATION | KNOCKING | NO KNOCKING |
|---|---|---|
| (A) EXCESSIVE ($Dthh \leq Dp$) | $G = G$ | $G = G/2$ |
| (B) APPROPRIATE ($Dthl \leq Dp < Dthh$) | $G = G$ | $G = G$ |
| (C) TOO SMALL ($Dp < Dthl$) | $G = 2 \times G$ | $G = G$ |

FIG. 16

| ABNORMAL COMBUSTION DETERMINATION / PEAK VALUE Dp | ABNORMAL COMB OCCURRED | NO ABNORMAL COMB |
|---|---|---|
| (A) EXCESSIVE ($Dthh \leq Dp$) | $G = G$ | $G = G/2$ |
| (B) APPROPRIATE ($Dthl \leq Dp < Dthh$) | $G = G$ | $G = G$ |
| (C) TOO SMALL ($Dp < Dthl$) | $G = 2 \times G$ | $G = G$ |

ELECTRONIC CONTROL UNIT OF INTERNAL COMBUSTION ENGINE

CROSS REFERENCE TO RELATED APPLICATION

The present application is based on and claims the benefit of priority of Japanese Patent Application No. 2011-271765, filed on Dec. 12, 2011, the disclosure of which is incorporated herein by reference.

TECHNICAL FIELD

The present disclosure generally relates to an electronic control unit (ECU) of an internal combustion engine which has an improved determination method of an abnormal combustion (e.g., knocking) of the engine.

BACKGROUND

The internal combustion engine (i.e., an engine, hereinafter) installed in a vehicle uses, for the most part, a knock control system for detecting knocking of the engine. The knock control system determines whether the engine is knocking or not based on the output signal of a knock sensor (e.g., a vibration sensor), and either advances or retards the ignition timing. That is, the ignition timing is advanced for the improvement of the torque when knocking is not detected, and the ignition timing is retarded for preventing the knocking when the knocking is detected.

In recent years, a knock detection method for detecting a small knock is desired for the improvement of combustion efficiency of the engine. For instance, according to, for example, Japanese Patent Laid-Open No. 2006-177259 (JP '259), a knock detection method is disclosed for accurately detecting a knock that is smaller than a noise vibration (i.e., a vibration caused by a factor other than the knock). Such knock detection is based on a comparison result that compares a predetermined ideal knock wave form with an actually-output sensor signal wave form from a knock sensor.

The knock detection method based on the knock wave form described above needs to quantize (i.e., digitize) the sensor signal in an accurate manner for the accurate detection of knocking. One of such detection method having such accuracy may be a method using a high resolution A/D converter. Conventionally, a $\Delta\Sigma$ type A/D converter is known for its high resolution at a comparatively low cost.

Further, for more accurate quantization of the sensor signal that changes its amplitude depending on the engine operation state, use of a variable amplification power (i.e., switching of amplification magnitudes) depending on the engine operation state at a moment of sensor signal detection is effective. That is, an amplification circuit having the variable amplification power may be used in combination with a middle-to-high resolution A/D converter, which is less expensive than the high resolution A/D converter, for the improvement of the knock determination accuracy at a relatively-lower cost.

In such case, the higher the amplification power of the variable-amp-power amplification circuit is, the more detailed the acquired information becomes. However, if the amplification power of the amplification circuit is too high, the output signal from the amplification circuit is saturated, and may deteriorate the accuracy of the knock determination.

To prevent such deterioration, Japanese Patent Laid-Open No. H05-340331 (JP '331) discloses a method that switches an amplification power, i.e., a gain, by having a large knock determination means for determining a large knock in addition to a normal knock determination means, and by utilizing a determination output from such large knock determination means.

Further, according to a method disclosed Japanese Patent Laid-Open No. H09-229823 (JP '823), a saturation of the signal from the amplification circuit is prevented by comparing the sensor output with a preset value and by inputting to the A/D converter the signal from a smaller-amp-power amplification circuit in a switching manner.

When the amplification power is switched in a period outside of the knock determination period, as disclosed in JP '331, it is important to quickly adjust/switch the amplification power to the change of the sensor signal amplitude in each of the knock determination period, for the accurate detection of a small knock.

Conventionally, the switching of the amplification power has been performed based on the engine rotation speed, the statistics of the amplitude of the past sensor signals, and the like. However, in such manner, the adjustment of the amplification power may not suitably be performed in response to the change of the sensor signal amplitude without delay, when the sensor signal amplitude drastically changes in each of the knock determination periods. That is, for example, when one ignition causing a large knock is followed by another ignition causing a small knock.

Therefore, the amplification power needs to have a smaller value, which includes a margin for accommodating a drastic change of the sensor signal amplitude, i.e., for preventing the saturation of the sensor signal output from the amplification circuit As a result, the accurate detection of the small knock becomes difficult, leading to the deterioration of the knock determination accuracy. Similar determination accuracy problem is also observed in a pre-ignition determination.

SUMMARY

In an aspect of the present disclosure, an electronic control unit (ECU) of the present disclosure includes a sensor, a sensor signal amplifier, and A/D converter. The sensor detects a vibration or a cylinder pressure of an internal combustion engine and outputs a sensor signal. The sensor signal amplifier amplifies the sensor signal from the sensor by changing an amplification power of the sensor signal. The A/D converter converts the sensor signal amplified by the sensor signal amplifier to a digital signal, which may be referred to as a digitized sensor signal.

The ECU further includes an abnormal combustion detector, an abnormal combustion controller, and an amplification controller. The abnormal combustion detector determines whether an abnormal combustion has occurred based on a characteristic of a waveform of the digitized sensor signal from the A/D converter. The abnormal combustion controller performs an abnormal combustion prevention control to prevent the abnormal combustion when the abnormal combustion detector determines that an abnormal combustion has occurred. The amplification controller sets the amplification power of the sensor signal amplifier based on an amplitude of the digitized sensor signal from the A/D converter and a determination result of the abnormal combustion by the abnormal combustion detector.

Since the abnormal combustion prevention control is performed for preventing the abnormal combustion when an abnormal combustion, such as a knock and a pre-ignition, is detected, the abnormal combustion does not occur in a subsequent abnormal combustion determination period, or the amplitude of the sensor signal in the subsequent abnormal combustion determination period becomes smaller than the amplitude in the current abnormal combustion determination period.

Further, in general, the vibration caused by an abnormal combustion is greater than a noise vibration. Based on these characteristics and in consideration of the sensor signal amplitude as well as the abnormal combustion determination result, the sensor signal amplitude in the subsequent abnormal combustion determination period is estimated in comparison to the amplitude in the current abnormal combustion determination period. That is, whether the amplitude in the next period is larger or smaller than the amplitude in the current period is predicted.

Therefore, based on the amplitude of the sensor signal and the determination result of the abnormal combustion, adjusting the amplification power of the sensor signal amplifier to an appropriate value is performed in advance with reference to an estimation of the amplitude range of the sensor signal in the subsequent abnormal combustion determination period, thereby enabling a quick adjustment of the amplification power even when the sensor signal amplification is drastically and/or steeply changed. Thus, while preventing the saturation of the output signal from the sensor signal amplification unit, accurate detection of a small abnormal combustion (e.g., a knock and a pre-ignition) is enabled, and the accuracy of the abnormal combustion determination is improved.

In such case, the abnormal combustion detector may detect, as the characteristic of the waveform of the digitized sensor signal, a pattern of the waveform for an abnormal combustion determination period. Based on the determination in such manner, the abnormal combustion is accurately distinguished from noise. That is, an abnormal combustion is highly accurately detected.

BRIEF DESCRIPTION OF THE DRAWINGS

Other objects, features and advantages of the present disclosure will become more apparent from the following detailed description disposed with reference to the accompanying drawings, in which:

FIG. 3 is an illustration of a setting method of an amplification power in the first embodiment;

FIG. 16 is an illustration of a setting method of the amplification power of the ninth embodiment.

DETAILED DESCRIPTION

Figure 1:
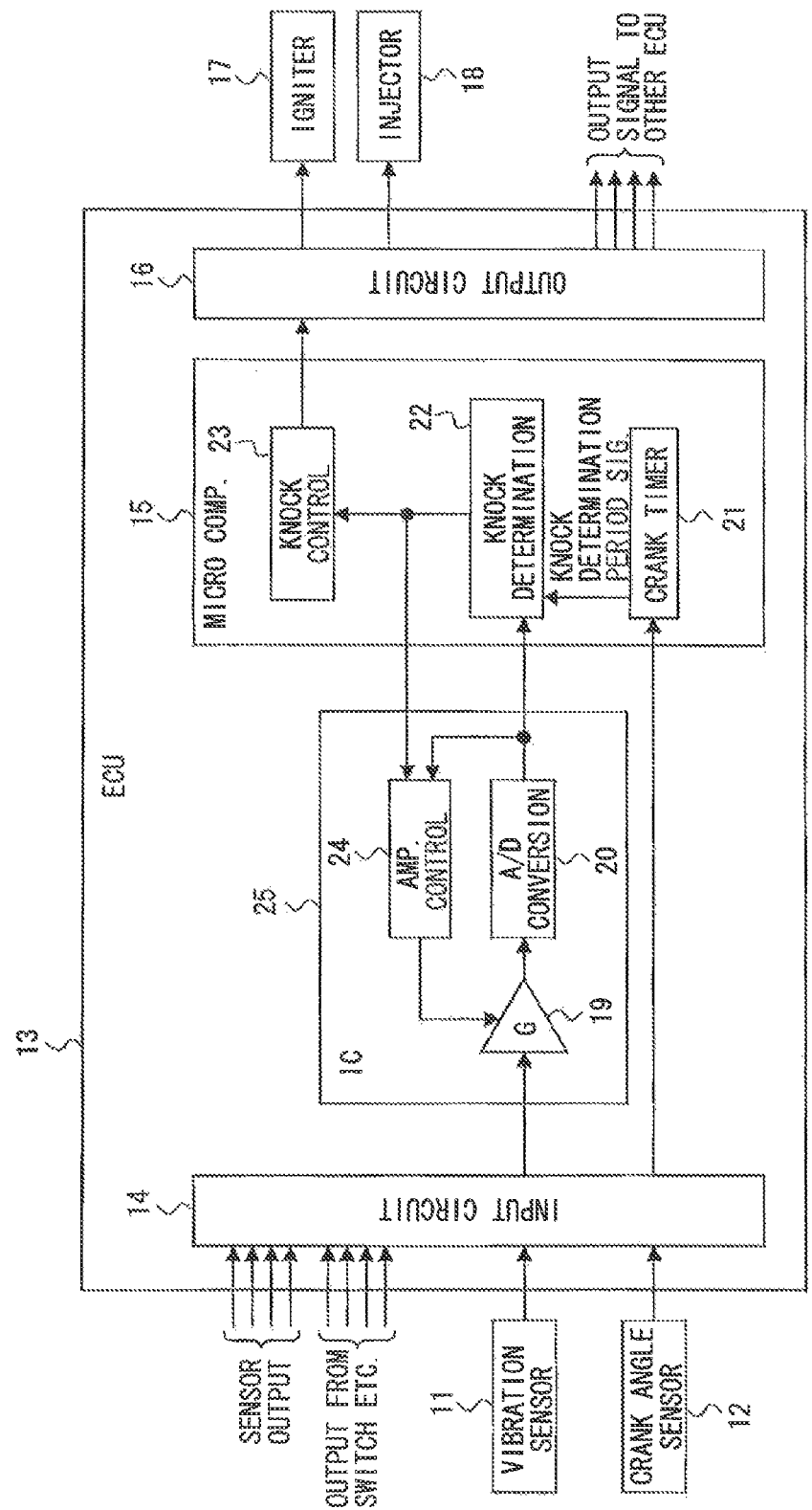
FIG. 1 is a block diagram of an engine control system n a first embodiment of the present disclosure.

In the following, the present disclosure is now described with reference to the drawings.

(First Embodiment 1)

The first embodiment of the present disclosure is described with reference to FIG. 1 to FIG. 4. An outline of an engine control system is described with reference to FIG. 1.

An electronic control unit (i.e., ECU) 13 receives information via a signal from various sensors through an input circuit 14. Such sensors include a vibration sensor 11 that detects the vibration of an internal combustion engine (i.e., engine) and a crank angle sensor 12 that provides a pulse signal for a predetermined rotation angle of a crank shaft of the engine. The ECU 13 includes a microcomputer 15, executing various engine control programs stored in a built-in ROM (i.e., a memory medium) for controlling, for example, ignition timings and fuel injection amount, and provides control signals to an igniter 17 and an injector 18.

The ECU 13 amplifies a sensor signal from the vibration sensor 11 by using a variable amplification power amplification circuit 19 (i.e., a sensor signal amplifier in claims). The variable amplification power amplification circuit 19 is abbreviated to a variable amplifier 19 hereinafter in the description.

An amplification control unit 24 changes the amplification power set of the variable amplifier 19 for amplifying the sensor signal. The sensor signal amplified by the variable amplifier 19 is digitized by an A/D conversion unit 20 (i.e., an A/D converter in claims), and is provided to a knock determination unit 22 and the amplification control unit 24.

The A/D conversion unit 20 is implemented as a $\Delta\Sigma$ type A/D converter that converts the analog signal to the digital signal with a $\Delta\Sigma$ modulation. By using such converter that achieves a higher resolution with a low-cost in comparison to other type of converters, the knock control of the present disclosure is performed with improved accuracy.

Based on the signal from the crank angle sensor 12, a crank timer 21 generates a preset knock determination period signal representing a knock is determination period, which is period in which a knock may occur (i.e., an abnormal combustion determination period). Based on a characteristic of a waveform of the sensor signal from the A/D conversion unit 20, the knock determination unit 22 (i.e., an abnormal combustion detector in claims) determines whether a knock was generated during the knock determination period, and the determination results are provided to a knock control unit 23 and the amplification control unit 24.

The knock determination unit 22 detects a pattern of the waveform of the sensor signal for the knock determination period, and compares the pattern detected with a preset pattern of a knock waveform for determining whether a knock was generated. In such manner, a knock is distinguished from noise in an accurate manner, thereby improving the accuracy of the knock determination (i.e., whether a knock was generated).

The knock control unit 23 (i.e., an abnormal, combustion controller in claims) advances the ignition timing when the knock determination unit 22 determines no knocking, and retards the ignition timing when the knock determination unit 22 determines knocking. By delaying the ignition time, the knock control unit 23 performs a knock prevention control for preventing the generation of a knock.

Further, the amplification control unit 24 sets the amplification power of the variable amplifier 19 based on: (i) an amplitude of the sensor signal from the A/D converter unit 20 for a current knock determination period (i.e., in one knock determination period) and (ii) a knock determination result for the current knock determination period (i.e., in one knock determination period). The amplification control unit 24 switches the amplification power of the variable amplifier 19 in a period outside the knock determination period (e.g., after the current knock determination period). The variable amplifier 19 uses the amplification power switched by the amplification control unit 24 until the end of a subsequent knock determination period.

In such manner, the amplification power is switched in a period outside the knock determination period, thereby preventing an overlap of noise onto the sensor signal that may occur when the switching of the amplification power is performed during the knock determination period. Further, the amplification power setting is performed based on the information from one knock determination period, and, thus, quickly reflects the influence of the switch on the engine operation state and enables a quick adjustment of the amplification power even when the engine operation state drastically changes.

In the present embodiment, the variable amplifier 19, the A/D conversion unit 20, and the amplification control unit 24 are implemented by an integrated circuit (IC) 25 which is provided as an external circuit of the microcomputer 15. The function of the amplification control unit 24 may be implemented by a dedicated circuit that is provided as an external circuit of the microcomputer 15 (i.e., the IC 25).

Figure 2:
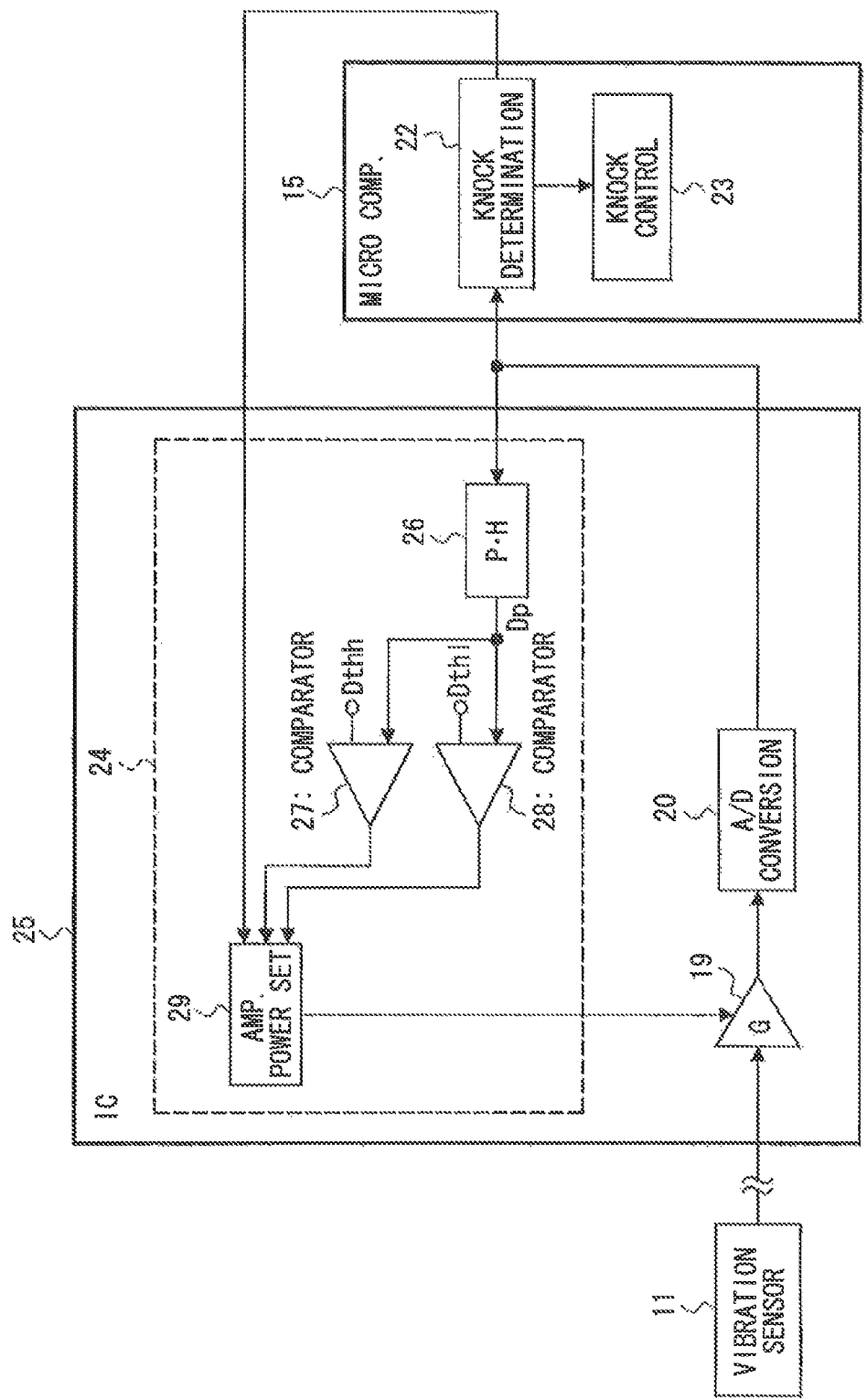
FIG. 2 is a block diagram of an amplification control unit and its periphery in the first embodiment.

An example of the amplification control nit 24 is described with reference to FIG. 2.

The amplification control unit 24 detects a peak value Dp of the sensor signal from the A/D conversion unit 20 for the current knock determination period by using a peak hold unit 26, and inputs the peak value Dp of the sensor signal to comparators 27, 28 (i.e., a comparator in claims).

The comparator 27 determines whether the amplitude of the sensor signal (i.e., a sensor signal amplitude hereinafter) has surpassed a predetermined upper threshold Dthh for the current knock determination period by comparing the peak value Dp of the sensor signal with the upper threshold Dthh. The comparator 28 determines whether the sensor signal amplitude in the current knock determination period has fallen below a predetermined lower threshold Dthl by comparing the peak value Dp of the sensor signal with the lower threshold Dthl. Accordingly, the output of the comparators 27, 28 provide a determination result of whether or not the amplitude of the sensor signal has exceeded the thresholds Dthl, Dthh for the current knock determination period In such manner, a process for comparing the sensor signal amplitude with the thresholds Dthl, Dthh need not be performed regularly. By comparing only the peak value Dp of the sensor signal with thresholds Dthl, Dthh once, whether the sensor signal amplitude has exceeded the thresholds Dthl, Dthh is determined. In other words, the required determination performance (i.e., a required calculation speed, a required specification) of the comparators 27, 28 can be eased, thereby leading to a cost reduction of the comparators 27, 28.

An amplification power set unit 29 sets the amplification power of the variable amplifier 19 based on the outputs of the comparators 27, 28 and the knock determination result for the current knock determination period. The amplification power set unit 29 changes (i.e., switches and updates) the amplification power of the variable amplifier 19 in a period that is outside of the knock determination period (i.e., after the current knock determination period). When switching the amplification power, the same amplification power may be set to all cylinders, or the respective cylinders may have a different amplification power.

With reference to FIG. 3, an amplification power setting method is described. In the following, the variable amplifier 19 is assumed to be a differential amplification circuit having a reference voltage Vcc of 2 and an output voltage of 0 to Vcc, with a variable amplification power G set to have a power-of-two value.

When the peak value Dp of the sensor signal for the current knock determination period falls into an "Excessive" range, which is equal to or greater than the upper threshold Dthh (Dthh≤Dp), the amplification power G is too big against the sensor signal amplitude, thereby making it easy to saturate the output of the variable amplifier 19.

When it is determined, for the current knock determination period, that the peak value Dp of the sensor signal exceeds the upper threshold Dthh and the knock determination unit 22 determines no knocking, the saturation of the output caused by a knock and/or the increase of the noise vibration is expected in a subsequent knock determination period. Therefore, the amplification power is decreased from G to G/2 (i.e., G=G/2) for preventing the saturation of the output from the variable amplifier 19, thereby improving the knock determination accuracy.

On the other hand, when it is determined, for the current knock determination period, that the peak value Dp of the sensor signal exceeds the upper threshold Dthh and the knock determination unit 22 determines that knocking has occurred, the amplification power G is kept unchanged (G=G). In such case, since the knock prevention control will be performed in a subsequent knock determination period for preventing knocking (i.e., to realize a knock prevention/suppression state), the knock amplitude in the subsequent period is expected to be equal to or smaller than the knock amplitude of the current knocking even when knocking is caused. Therefore, the saturation of the output from the variable amplifier 19 will not be caused even when the amplification power G is kept unchanged.

Further, by keeping the amplification power G unchanged, the knock determination will be performed by a higher amplification power in comparison to a case when the amplification power G is decreased, thereby making it easy to detect a smaller knock that may still be generated even when the knock prevention control is performed.

When the peak value Dp of the sensor signal in the current knock determination period falls into an "Appropriate" range, which is in a range between the lower threshold Dthl and the upper threshold Dthh (Dthl≤Dp<Dthh), it is determined that the amplification power G is an appropriate value, and the same value of the amplification power G is used in the subsequent knock determination period (G=G).

When the peak value Dp of the sensor signal in the current knock determination period falls into a "Too small" range, which is smaller than the lower threshold Dthl, the amplification power G is small against the, sensor signal amplitude, thereby making it difficult to detect small knocking.

When it is determined, for the current knock determination period, that the peak value Dp of the sensor signal falls below the lower threshold Dthl and the knock determination unit 22 determines that knocking has occurred, the amplification power is increased from G to 2G for the improvement of the resolution in the subsequent knock determination period (G=2×G). When the knocking is detected for the current knock determination, the knock prevention control will be performed in the subsequent knock determination period for preventing knocking (i.e., to realize a knock prevention/suppression state). Accordingly, the knock amplitude is expected to be equal to or smaller than the knock amplitude of the current knocking even when knocking occurs.

Therefore, when an A/D converted value of the power source voltage Vcc is designated as Dcc, the saturation of the output will be prevented, even when the amplification power G is increased from G to 2G, by setting the lower threshold Dthl to have a value equal to or smaller than three quarters of Dcc (i.e., Dthl≤(¾)×Dcc). That is, the peak value Dp of the sensor signal will be equal to or smaller than Dcc for the subsequent knock determination period. In other words, the output from the variable amplifier 19 having a value equal to or smaller than Vcc will not saturate. In such manner, the amplification power is increased to have a value range that will not lead to the saturation of the output signal from the variable amplifier 19, thereby improving the knock determination accuracy.

On the other hand, when, it is determined, for the current knock determination period, that the peak value Dp of the sensor signal falls below the lower threshold Dthl and the knock determination unit 22 determines no knocking, the amplification power G is kept unchanged (G=G).

In general, since the knock vibration amplitude is greater than the amplitude of the noise vibration that is caused by other factor other than the knock, the output from the variable amplifier 19 will be saturated in the subsequent knock determination period in case that (a) the amplification power has been increased in response to the noise vibration level of no knocking period and (b) the knocking is caused in the subsequent knock determination period after such increase of the amplification power. However, by performing the amplification power increase by increasing the amplification power only at a time when the small knock is detected, the amplification power G is maintained to a level that prevents the saturation of the output from the variable amplifier 19 even when knocking has occurred.

Further, the lower threshold Dthl and the upper threshold Dthh may be set as respectively different values depending on the amplification power and/or the engine rotation speed. For example, based on the measurement of the peak value Dp for a predetermined period with the amplification power fixed to 1 (i.e., G), each of the thresholds is set to have a value that includes a margin for preventing the saturation for each of the usable amplification powers.

The saturation of the output of the variable amplifier 19 is caused when the sensor signal amplitude is steeply increased in the subsequent knock determination period due to knocking or a large noise after having a peak value Dp of the sensor signal in the current knock determination period, which is slightly lower than the upper threshold Dthh.

If the peak value Dp in a former knock determination period is subtracted from the peak value Dp in a latter knock determination period for calculating a value (i.e., a difference) ΔDp when the former and latter periods are two successive knock determination periods, and the maximum value of the ΔDp for the predetermined measurement period is designated as ΔDpmax, the value ΔDpmax is a maximum amplitude increase for such period.

If the upper threshold Dthh and the lower threshold Dthl are respectively designated as Dthh(G) and Dthl(G) when the amplification power G is set, the saturation of the output from the variable amplifier 19 in the subsequent knock determination period is prevented by choosing a suitable value of Dthh (G) that satisfies the following expression.

$$Dthh(G) \leq Dcc - G \times \Delta Dpmax$$

On the other hand, the lower threshold Dthl(G) is set to have a value that satisfies the following expression.

$$Dthl(G) = (\tfrac{1}{2}) \times \{Dthh(2G) + Dcc/2\} \leq (\tfrac{3}{4}) \times Dcc$$

In case that the amplification power is increased from G to 2G for the subsequent knock determination period after having the peak value Dp for the current knock determination period being equal to or smaller than the lower threshold Dthl(G), the subsequent peak value Dp will be equal to or smaller than the upper threshold Dthh (2G) if the sensor signal amplitude in the subsequent knock determination period is equal to or smaller than the last (i.e., current) period, thereby not causing the saturation of the output from the variable amplifier 19.

In the above operation, the amplification power G is not required to have a power-of-two value (i.e., $2^x$), or the amplification power may be switched in a multi-step manner by adding other thresholds. Further, the lower and the upper thresholds Dthl, Dthh may be set as Dcc/2≤Dthl≤Dthh≤Dcc. On the other hand, when the sensor signal's minimum peak value in the knock determination period is designated as Dp, the upper and lower thresholds Dthh, Dthl may be set as 0≤Dthh≤Dthl≤Dcc/2. Further, for each of the two ranges 0 to Dcc/2 and Dcc/2 to Dcc, a threshold may be set for the comparison with the minimum peak value and the maximum peak value, respectively.

Figure 4:
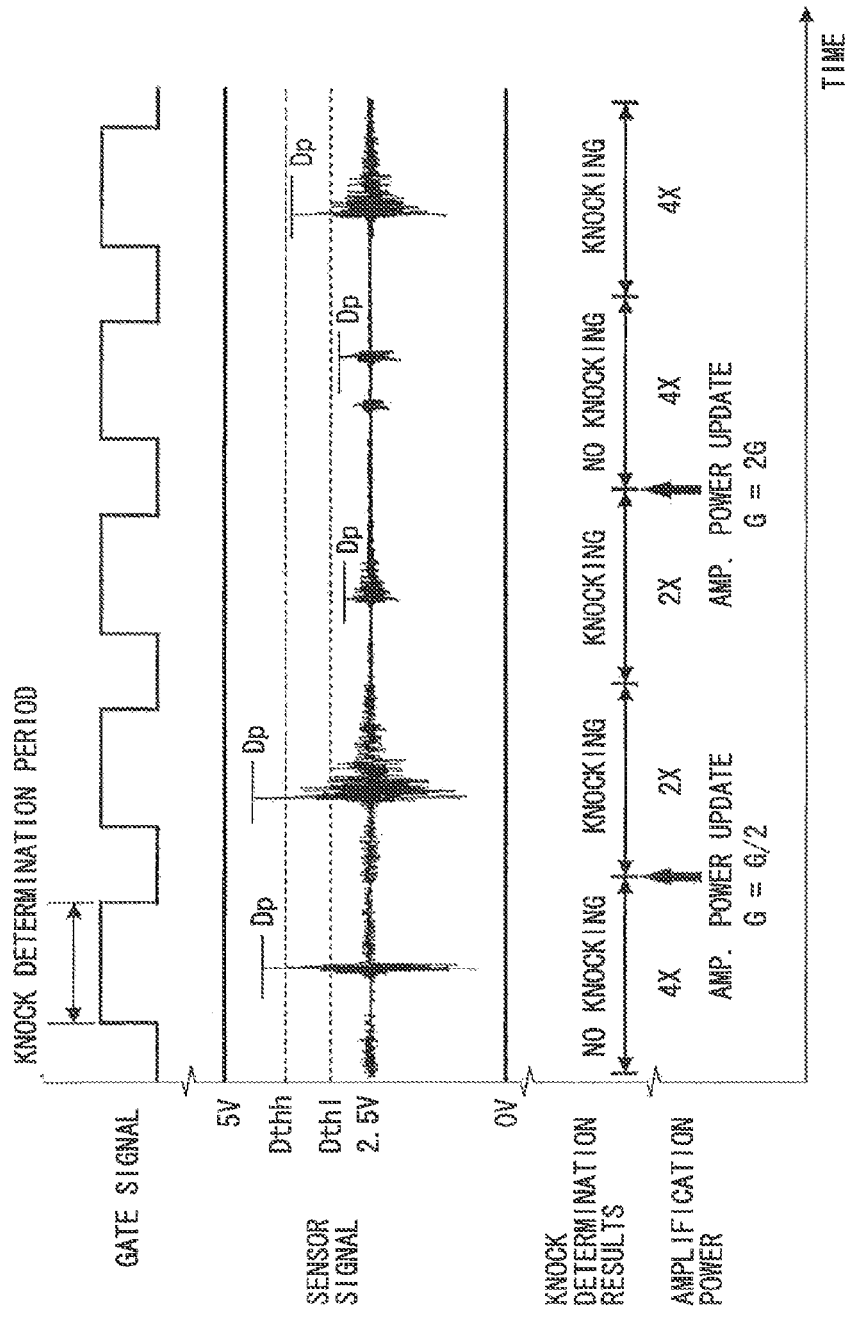
FIG. 4 is a time chart of a knock control in the first embodiment.

The knock control of the present embodiment is described in the following with reference to FIG. 4. In the following description, a gate signal is a signal representing a knock determination period.

In the first knock determination period, a sensor signal (i.e., a sensor signal that is output from the A/D conversion unit 20 after amplification) having a peak value Dp that exceeds the upper threshold Dthh is provided as a noise. In general, the knock vibration amplitude is greater than the amplitude of the noise vibration. Therefore, if a knock is caused in the subsequent knock determination period, the output from the variable amplifier 19 may be saturated. For preventing the saturation of the output from the variable amplifier 19, the amplification power is decreased to 2 from 4.

In the second knock determination period, knocking is detected, which has a peak value Dp greater than the noise in the first knock determination period, and the peak value Dp exceeds the upper threshold Dthh with the amplification power currently set to 2. In this case, due to the decrease of the amplification power from 4 to 2, the saturation of the output from the variable amplifier 19 is prevented.

Further, due to the detection of knocking in the second knock determination period, the knock prevention control will be performed for the subsequent knock determination period. Therefore, the sensor signal amplitude for the subsequent knock determination period is expected to be equal to or smaller than the amplitude of the second knock determination period (i.e., current knock determination period). Thus, the amplification power is not decreased for preventing the saturation of the output from the variable amplifier 19 even when the knock exceeds the upper threshold Dthh. Therefore, the amplification power is maintained as 2.

In the third knock determination period, even after the knock prevention control due to the knock determination for the second knock determination period (i.e., previous knock determination period), the knocking has not been completely prevented, leading to the detection of small knocks under the lower threshold Dthl with the amplification power currently set to 2. As in the previous knock determination period, the knocking is still detected in the third knock determination period (i.e., current knock determination period), thereby causing the knock prevention control to be performed again. As a result, the sensor signal amplitude for the subsequent knock determination period will be expected to be even smaller than the current amplitude that is already smaller than the lower threshold Dthl. Thus, the amplification power for the subsequent knock determination period is increased to 4. In such manner, the detection of the small knocking is enabled, and the output from the variable amplifier 19 will not be saturated.

In the fourth knock determination period, small vibrations that are smaller than the lower threshold Dthl are provided with the amplification power of 4. However, based on the knock determination result, which indicates no knocking, it is determined that the small vibrations are caused by noise. Accordingly, if knocking is generated in the subsequent period, the amplitude of the vibration may steeply increase. Therefore, the amplification power is not increased, and is maintained at 4.

In the fifth knock determination period, knocking is detected and the sensor signal peak value Dp falls into a range between the lower threshold Dthl and the upper threshold Dthh with the amplification power at 4. By maintaining the amplification power to the value of 4, the output from the variable amplifier 19 is not saturated, and knocking is properly detected.

In the present embodiment, the amplification power of the variable amplifier 19 is set based on the sensor signal amplitude and the knock determination result for the knock determination period. Therefore, an appropriate amplification power of the variable amplifier 19 is set in advance based on an estimation of the sensor signal amplitude range for the subsequent knock determination period, thereby enabling a quick adjustment of the amplification power even when the amplitude of the sensor signal steeply changes. In such manner, while preventing the saturation of the output signal from the variable amplifier 19, small knocking is accurately detected and the knock determination accuracy is improved.

Further, in the present embodiment, the function of the amplification control unit 24 is performed by a dedicated circuit (i,e., the IC 25) that is provided as an external circuit external to the microcomputer 15. Therefore, the processing load of the microcomputer 15 is decreased in comparison to a scheme that implements the function of the amplification control unit 24 entirely as a software process by the microcomputer 15. Further, no design change will be required for the microcomputer 15. Therefore, the present disclosure is easily realized.

In addition, the variable amplifier 19 and the A/D conversion unit 20 are implemented by the IC 25 (i.e., an integrated circuit) which is provided as an external circuit of the microcomputer 15. Therefore, no design change will be required for the amplifier and the A/D converter in the microcomputer 15, thereby more easily enabling the implementation of the present disclosure.

Per the present disclosure, since a ΔΣ type A/D converter is generally equipped with a digital filter, a certain period of time (i.e., "an output signal stabilization period") is required after switching an input for having an output signal of the converter stabilized. In other words, the ΔΣ type A/D converter, which is required to perform the amplification power switching in the knock determination period, is not suitable for use in which the A/D conversion is performed at high speed and successively. Therefore, for such use, the successive approximation type A/D converter, which is different from the ΔΣ type A/D converter may be required. However, when the successive approximation type A/D converter is used to achieve the same level of resolution as the ΔΣ type A/D converter, the circuit size and the cost will increase. Further, when the amplification power is switched in the knock determination period, the electric noise from such amplification power switching may be added to the sensor signal.

Therefore, the amplification control unit 25 may switch the amplification power of the variable amplifier 19 in a period outside of the abnormal combustion determination period, and the variable amplifier 19 may use, i.e., continue to use, the amplification power switched by the amplification controller until an end of a subsequent abnormal combustion determination period.

In such manner, the amplification power is switched in a period that is outside of the abnormal combustion determination period, thereby preventing the amplification power switching noise to be added to or superposed on the sensor signal.

When the amplification power is switched in an "off-determination" period, which is defined as outside of the abnormal combustion determination period, the ΔΣ type A/D converter which requires an output signal stabilization period can be used. Thus, as the A/D converter 20, the ΔΣ type A/D conversion device may be used. In such manner, the cost of the device is reduced and the accuracy of the abnormal combustion determination is improved.

In the following, the second to tenth embodiments of the current disclosure are described with reference to FIG. 5 to FIG. 17. For the brevity of the description, the same configuration and the like as the first embodiment are omitted from the following description. That is, the following description is focused to the difference from the first embodiment.

(Second Embodiment)

Figure 5:
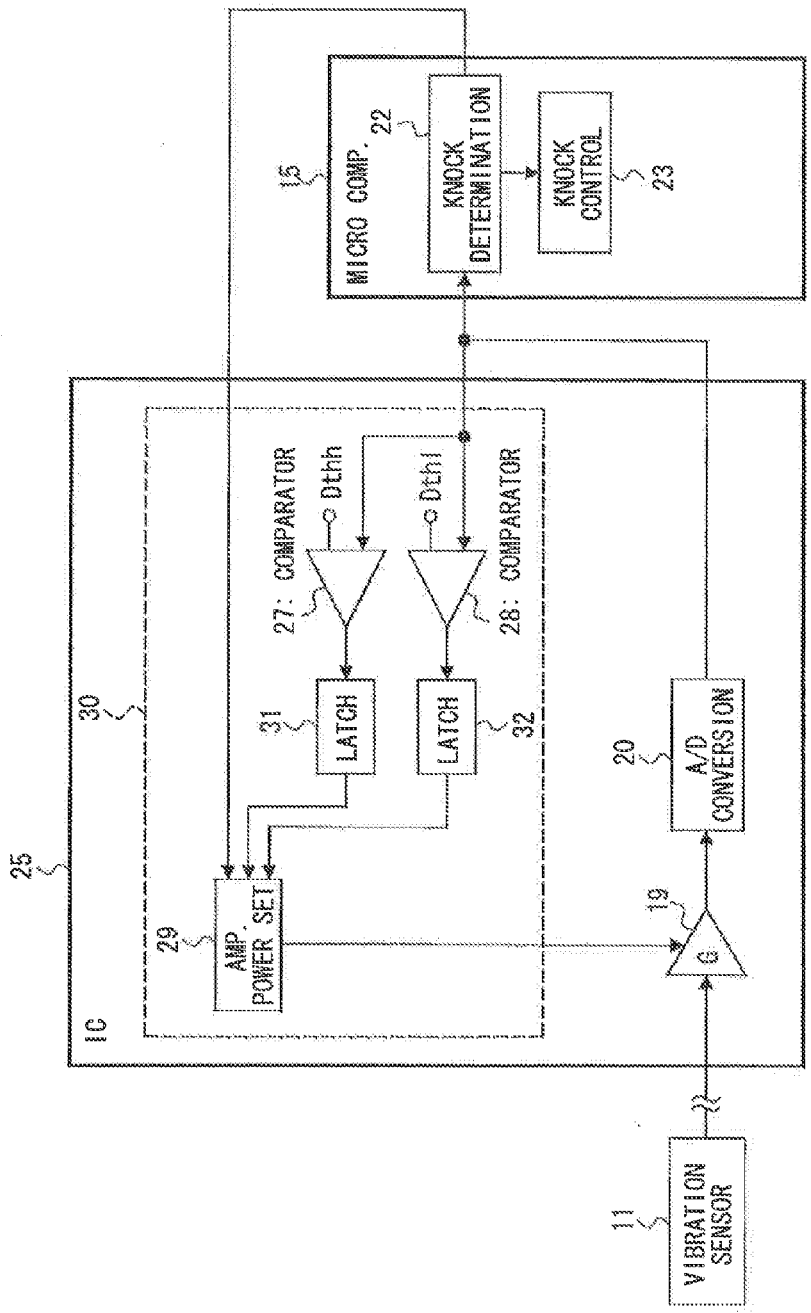
FIG. 5 is a block diagram of an amplification control unit and its periphery in a second embodiment.

With reference to FIG. 5, in the second embodiment an amplification control unit 30 provides a sensor signal from the A/D conversion unit 20 for the current knock determination period to the comparators 27, 28. The comparator 27 determines whether the amplitude of the sensor signal has surpassed the upper threshold Dthh for the current knock determination period. If the amplitude of the sensor signal has surpassed the upper threshold Dthh, an output signal of a latch 31 is switched, and such a switched state of the latch 31 is kept unchanged until the end of the knock determination period.

Further, the comparator 28 determines whether the amplitude of the sensor signal has fallen below the lower threshold Dthl for the current knock determination period. If the amplitude of the sensor signal has fallen below the lower threshold Dthl, an output signal of a latch 32 is switched, and such a switched state of the latch 32 is kept unchanged until the end of the knock determination period. Accordingly, the output of the latches 31, 32 provides a determination result of whether or not the amplitude of the sensor signal has exceeded the thresholds Dthl, Dthh for the current knock determination period.

The amplification power set unit 29 sets the amplification power of the variable amplifier 19 based on the output of the latches 31, 32 and the knock determination result for the current knock determination period, and it changes (i.e., switches and updates) the amplification power of the variable amplifier 19 in a period that is outside of the knock determination period (i.e., after the end of the current knock determination period).

In the present embodiment, as in the first embodiment, the variable amplifier 19, the A/D conversion unit 20, and the amplification control unit 30 are implemented by the IC 25, which is provided as an external part outside of the microcomputer 15. In addition, the function of the amplification control unit 30 is implemented by a dedicated circuit that is provided as an external circuit of the microcomputer 15 (i.e., the IC 25). Other configurations are same as the first embodiment.

According to the second embodiment, substantially same advantageous effects as the first embodiment described above are achieved.

(Third Embodiment)

Figure 6:
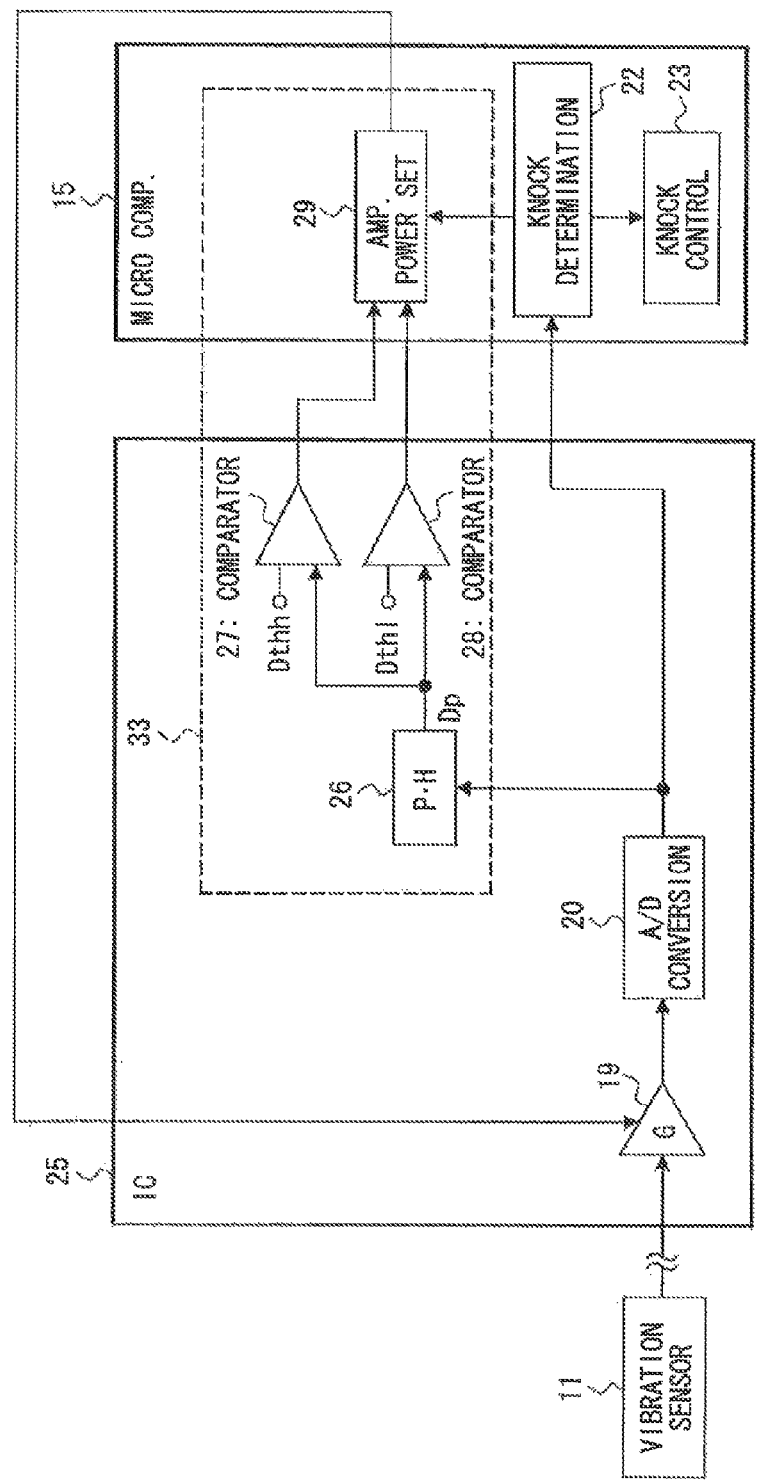
FIG. 6 is a block diagram of an amplification control unit and its periphery in a third embodiment.

In the first embodiment (FIG. 2), the peak hold unit 26 of the amplification control unit 24 as well as the comparators 27, 28 and the amplification power set unit 29 are implemented by the IC 25 that is external to the microcomputer 15. However, in the third embodiment, as shown in FIG. 6, the amplification power set unit 29 of an amplification control unit 33 is provided in the microcomputer 15, whereas the peak hold unit 26 and the comparators 27, 28 are implemented by the IC 25 that is external to the microcomputer 15.

In such case, the function of the amplification power set unit 29 may be implemented as a dedicated circuit in the microcomputer 15, or the function of the amplification power set unit 29 may be implemented as a software process performed by the microcomputer 15. Other configurations are the same as the first embodiment.

In the third embodiment, the function of the amplification control unit 33 is implemented by both of a dedicated circuit that is provided as an external circuit of the microcomputer 15 (i.e., the IC 25) and a dedicated circuit in the microcomputer 15 or a software process by the microcomputer 15. Therefore, the process load of the microcomputer 15 is eased (i.e., decreased) in comparison to a scheme in which the function of the amplification control unit 33 is entirely implemented as a software process by the microcomputer 15.

(Fourth Embodiment)

Figure 7:
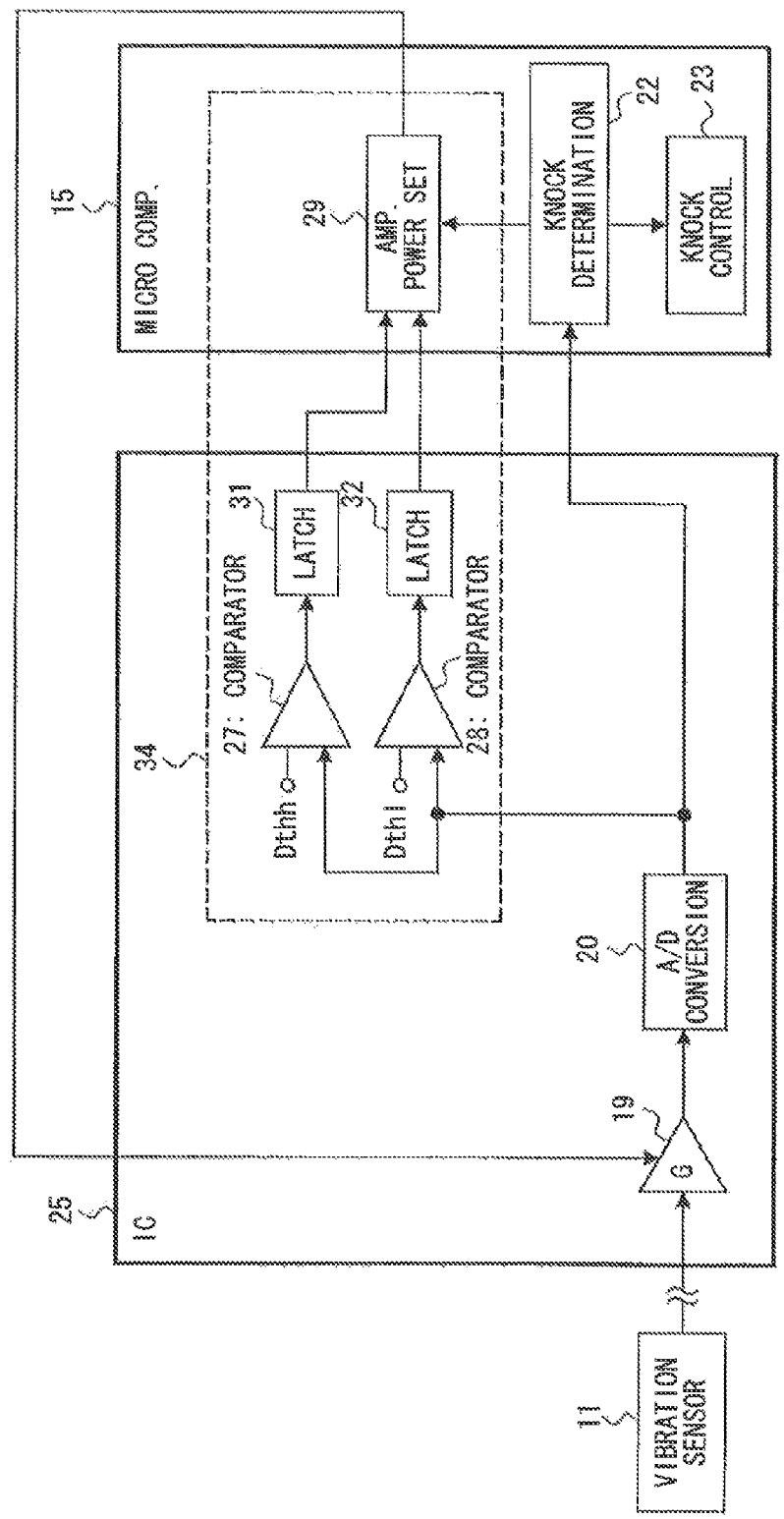
FIG. 7 is a block diagram of an amplification control unit and its periphery in a fourth embodiment.

In the second embodiment (FIG. 5), the comparators 27, 28, the latches 31, 32, and the amplification power set unit 29 are implemented as the IC 25 that is provided as an external part of the microcomputer 15. However, as shown in FIG. 7, in the fourth embodiment, the amplification power set unit 29 of an to amplification control unit 34 is provided in the microcomputer 15, whereas the comparators 27, 28 and the latches 31, 32 of the amplification control unit 34 are implemented by the IC 25 that is an external part of the microcomputer 15.

In such case, the function of the amplification power set unit 29 may be implemented as a dedicated circuit in the microcomputer 15, or the function of the amplification power set unit 29 may be implemented as a software process performed by the microcomputer 15. Other configurations are same as the second embodiment.

According to the fourth embodiment, substantially same advantageous effects as the third embodiment described above are achieved.

(Fifth Embodiment)

Figure 8:
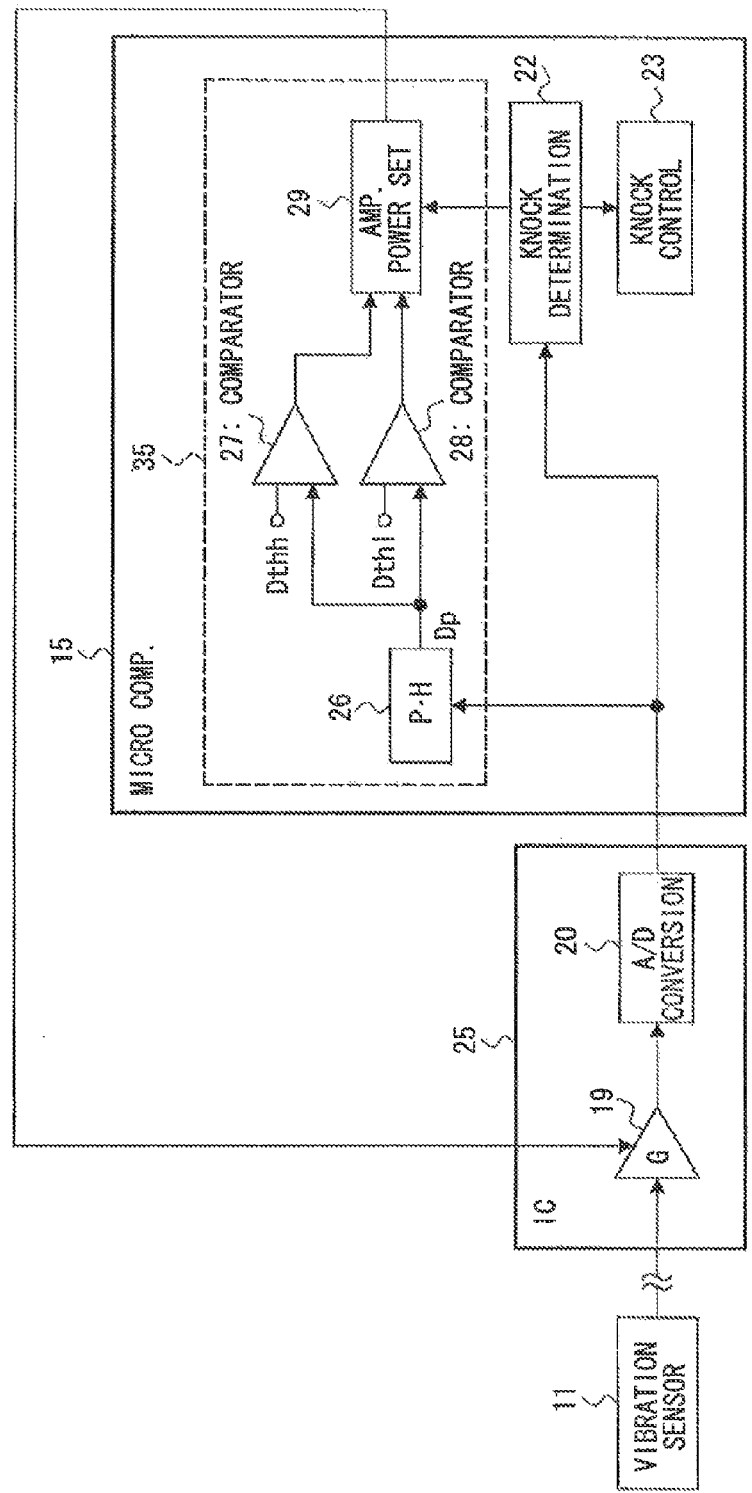
FIG. 8 is a block diagram of an amplification control unit and its periphery in a fifth embodiment.

In the first embodiment (FIG. 2), the amplification control unit 24 (i.e., the peak hold unit 26 and the comparators 27, 28 and the amplification power set unit 29) is implemented by the IC 25 that is provided as an external part of the microcomputer 15. However, as shown in FIG. 8, an amplification control unit 35, which includes the peak hold unit. 26, the comparators 27, 28, and the amplification power set unit 29, is provided in the microcomputer 15.

Further, in the present embodiment, the function of the amplification control unit 35 may be implemented as a software process by the microcomputer 15 by an execution of an amplification control routine by the ECU 13 (i.e., the microcomputer 15). Other configurations are the same as the first embodiment.

Figure 9:
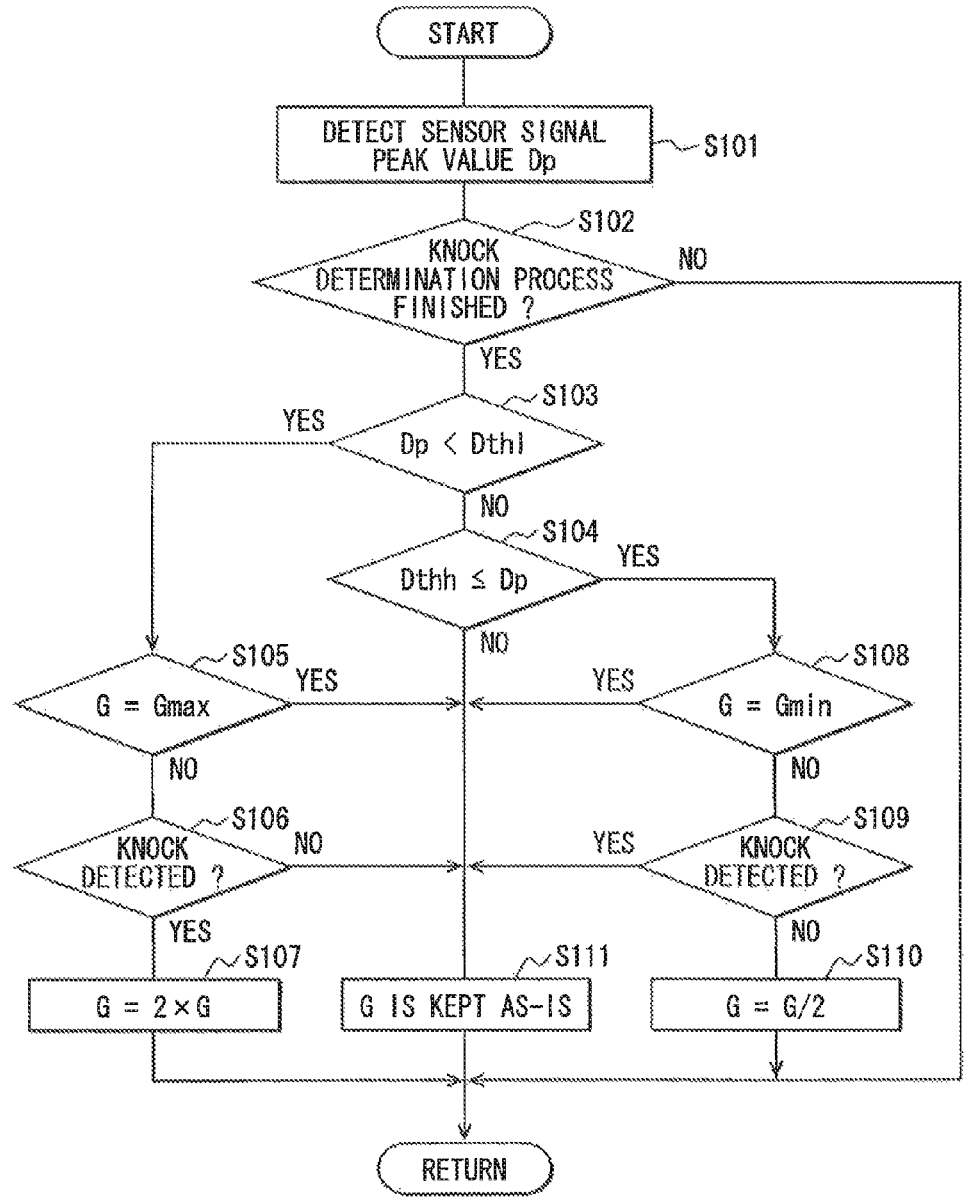
FIG. 9 is a flowchart of an amplification control process of the fifth embodiment.

With reference to FIG. 9, the amplification control routine is executed repeatedly at regular intervals, and the routine serves as an amplification controller in claims.

When the routine is started, the ECU 13 at S101 detects the peak value Dp of the sensor signal from the A/D conversion unit 20 for the current knock determination period. At S102, the ECU 13 determines whether the current knock determination process is finished. After the current knock determination process (S102:Yes), the ECU 13, at S103, determines whether the peak value Dp of the sensor signal for the current knock determination period is smaller than the lower threshold Dthl.

If the peak value Dp is smaller than the lower threshold Dthl (S103:Yes), the ECU 13, at S105, determines whether the amplification power G is a maximum value Gmax (i.e., the maximum value of the amplification power which can be used by the variable amplifier 19). If the amplification power G is the maximum value Gmax (S105:Yes), the ECU 13 maintains the amplification power G at the current value (G=G), at S111.

On the other hand, if the amplification power G is not the maximum value Gmax (S105:No), the ECU 13 determines whether knocking was detected in the current knock determination period, at S106. If no knocking was detected in the current knock determination period (S106:No) (i.e., the peak value Dp of the sensor signal is smaller than the lower threshold Dthl and no knocking was detected), the ECU at S111 maintains the amplification power G at the current value (G=G).

In contrast, if knocking was detected in the current knock determination period (S106:Yes) (i.e., the peak value Dp of the sensor signal is smaller than the lower threshold Dthl and knocking was detected), the ECU increases the amplification power from G to 2G (G=2×G), at S107.

If the peak value Dp of the sensor signal is not less than (i.e., is equal to or greater than) the lower threshold Dthl (S103:No), the ECU at S104, determines whether the peak value Dp of the sensor signal for the current knock determination period is equal to or greater than the upper threshold Dthh.

If the peak value Op of the sensor signal is equal to or greater than the upper threshold Dthh (S104:Yes), the ECU 13 at S108 determines whether the amplification power G is a minimum value Gmin (i.e., the minimum value of the amplification power which can be used by the variable amplifier 19). If the amplification power G is the minimum value Gmin (S108:Yes), the ECU maintains the amplification power G at the current value (G=G) at S111.

On the other hand, if it the amplification power G is not the minimum value Gmin (S108:No) (i.e., the amplification power G is greater than the minimum value Gmin), the ECU 13 determines whether knocking was detected in the current knock determination period at S109. If knocking was detected in the current knock determination period (S109: Yes) (i.e., the peak value Dp of the sensor signal is equal to or greater than the upper threshold Dthh and knocking was detected), the ECU maintains the amplification power G at the current value (G=G) at S111.

In contrast, if knocking was not detected in the current knock determination period (S109:No) (i.e., the peak value Dp of the sensor signal is equal to or greater than the upper threshold Dthh and knocking was not detected), the ECU 13 decreases the amplification power from G to G/2 (G=G/2) at S110.

Further, if the peak value Dp of the sensor signal is not less than (i.e., is equal to or greater than) the lower threshold Dthl (S103:No) and if the peak value Dp of the sensor signal is not greater than or equal to (i.e., is smaller than) the upper threshold Dthh (S104:No), the amplification power G is an appropriate amplification power, and the ECU maintains the amplification power G at the current value (G=G), at S111.

According to the present embodiment, the function of the amplification control unit 35 is implemented as a software process by the microcomputer 15. Therefore, no new dedicated circuit for implementing the function of the amplification control unit 35 is required. Thus, the cost reduction of the electronic control unit is achieved.

Though the function of the amplification control unit 35 is implemented as a software process by the microcomputer 15 in the present embodiment, such configuration may be changed. That is, the function of the amplification control unit 35 may be implemented, either in part or as a whole, by a dedicated circuit that is provided in the microcomputer 15. In such manner, no new external circuit for implementing the function of the amplification control unit 35 is required. Thus, the cost reduction of the electronic control unit is achieved.

(Sixth Embodiment)

Figure 10:
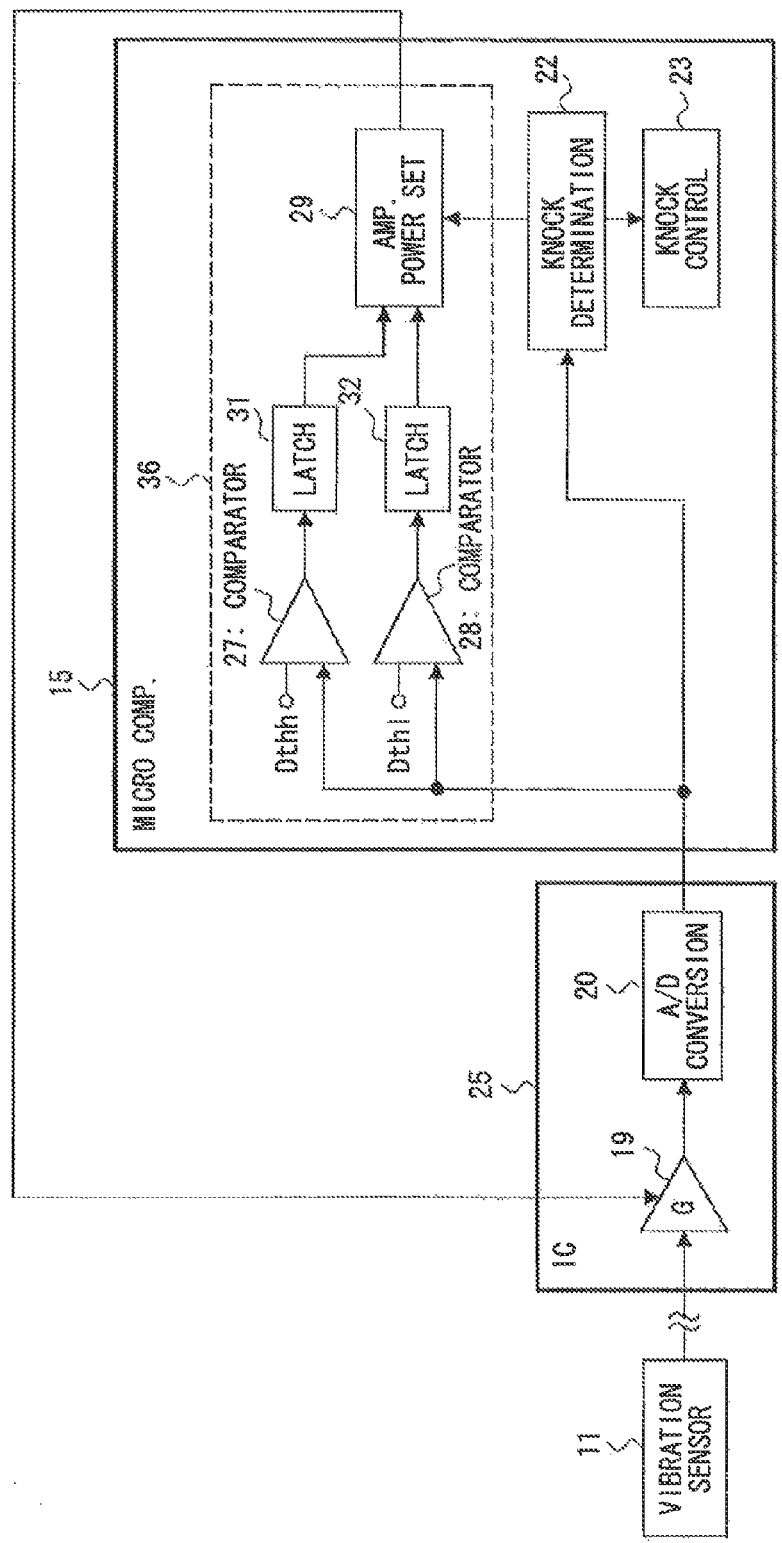
FIG. 10 is a block diagram of an amplification control unit and its periphery in a sixth embodiment.

In the second embodiment (FIG. 5), the amplification control unit 30, which includes the comparators 27, 28, the latches 31, 32, and the amplification power set unit 29, are implemented by the IC 25, which is provided as an external part outside of the microcomputer 15. However, as shown in FIG. 10, in the sixth embodiment an amplification control unit 36, which includes the comparators 27, 28, latches 31, 32, and the amplification power set unit 29, is provided in the microcomputer 15.

In such case, the function of the amplification control unit 36 may be implemented as a software process by the microcomputer 15, or the function of the amplification control unit 36 may be implemented, either in part or as a whole, by a dedicated circuit that is provided in the microcomputer 15. Other configurations are the same as the second embodiment. Thus, the present embodiment achieves the substantially same advantageous effects as the fifth embodiment.

(Seventh Embodiment)

Figure 11:
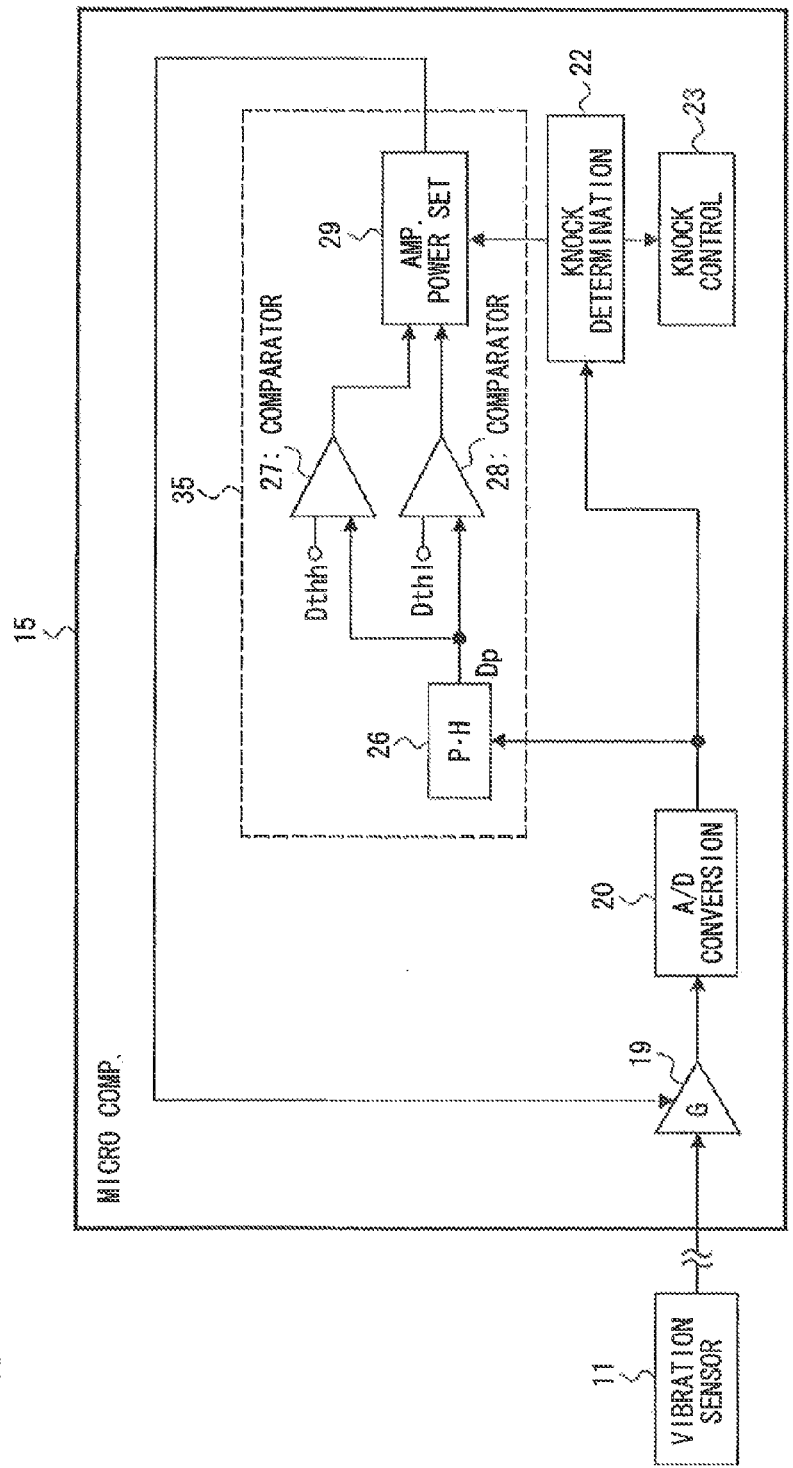
FIG. 11 is a block diagram of an amplification control unit and its periphery in a seventh embodiment.

In the fifth embodiment (FIG. 8), the variable amplifier 19 and the A/D conversion unit 20 are implemented by the IC 25, which is provided as an external part outside of the microcomputer 15. However, as shown in FIG. 11, the variable amplifier 19 and the A/D conversion unit 20 is provided in the microcomputer 15, along with the amplification control unit 35, which includes the peak hold unit 26, the comparators 27, 28, and the amplification power set unit 29.

In such case, the function of the variable amplifier 19 and the function of the A/D conversion unit 20 may be implemented as a software process by the microcomputer 15. Alternatively, one or both of the functions of the variable amplifier 19 and the A/D conversion unit 20 may be implemented as a dedicated circuit that is provided in the microcomputer 15. Other configurations are the same as the fifth embodiment.

In the present embodiment, the variable amplifier 19 and the A/D conversion unit 20 are provided in the microcomputer. Therefore, no new external circuit is required for implementing the functions of the variable amplifier 19 and the A/D conversion unit 20, thus a cost reduction of the electronic control unit is achieved in the seventh embodiment.

(Eighth Embodiment)

Figure 12:
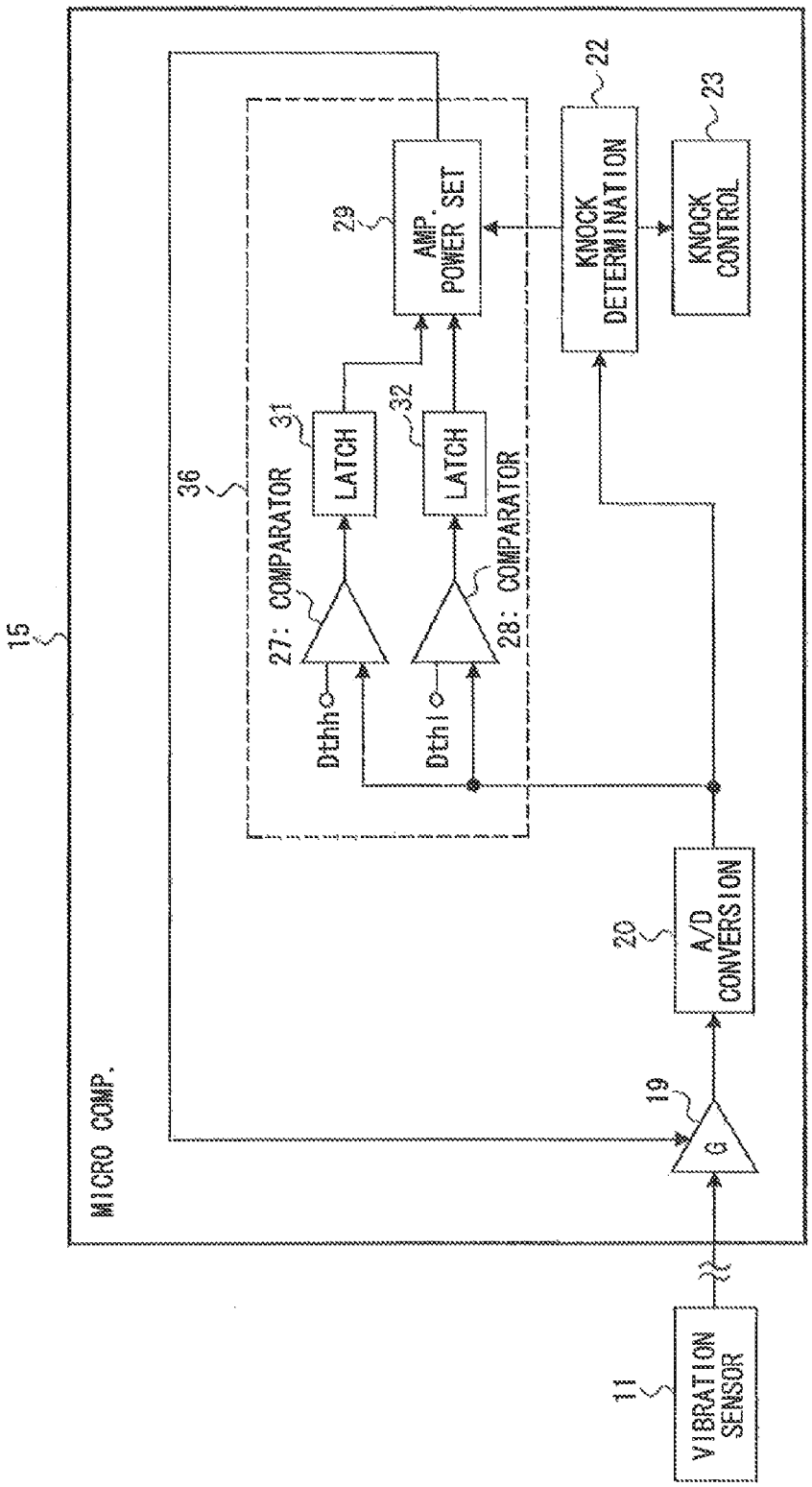
FIG. 12 is a block diagram of an amplification control unit and its periphery in an eighth embodiment.

In the sixth embodiment (FIG. 10), the variable amplifier 19 and the A/D conversion unit 20 are implemented by the IC 25, which is provided as an external part outside of the microcomputer 15. However, as shown in FIG. 12, the variable amplifier 19 and the A/D conversion unit 20 are provided in the microcomputer 15, along with the amplification control unit 36, which includes the comparators 27, 28, latches 31, 32 and the amplification power set unit 29.

In such case, the functions of the variable amplifier 19 and the A/D conversion unit 20 may be implemented as a software process by the microcomputer 15. Alternatively, one or both of the functions of the variable amplifier 19 and the A/D conversion unit 20 may be implemented as a dedicated circuit, which is provided in the microcomputer 15. Other configurations are the same as the above-described sixth embodiment.

Thus, the present embodiment achieves substantially the same advantageous effects as the seventh embodiment.

Further, in each of the seventh and eighth embodiments, both of the variable amplifier 19 and the A/D conversion unit 20 are provided in the microcomputer 15. However, the variable amplifier 19 may be provided as an external part outside of the microcomputer 15, and the A/D conversion unit 20 may be provided in the microcomputer 15.

(Ninth Embodiment)

Figure 13:
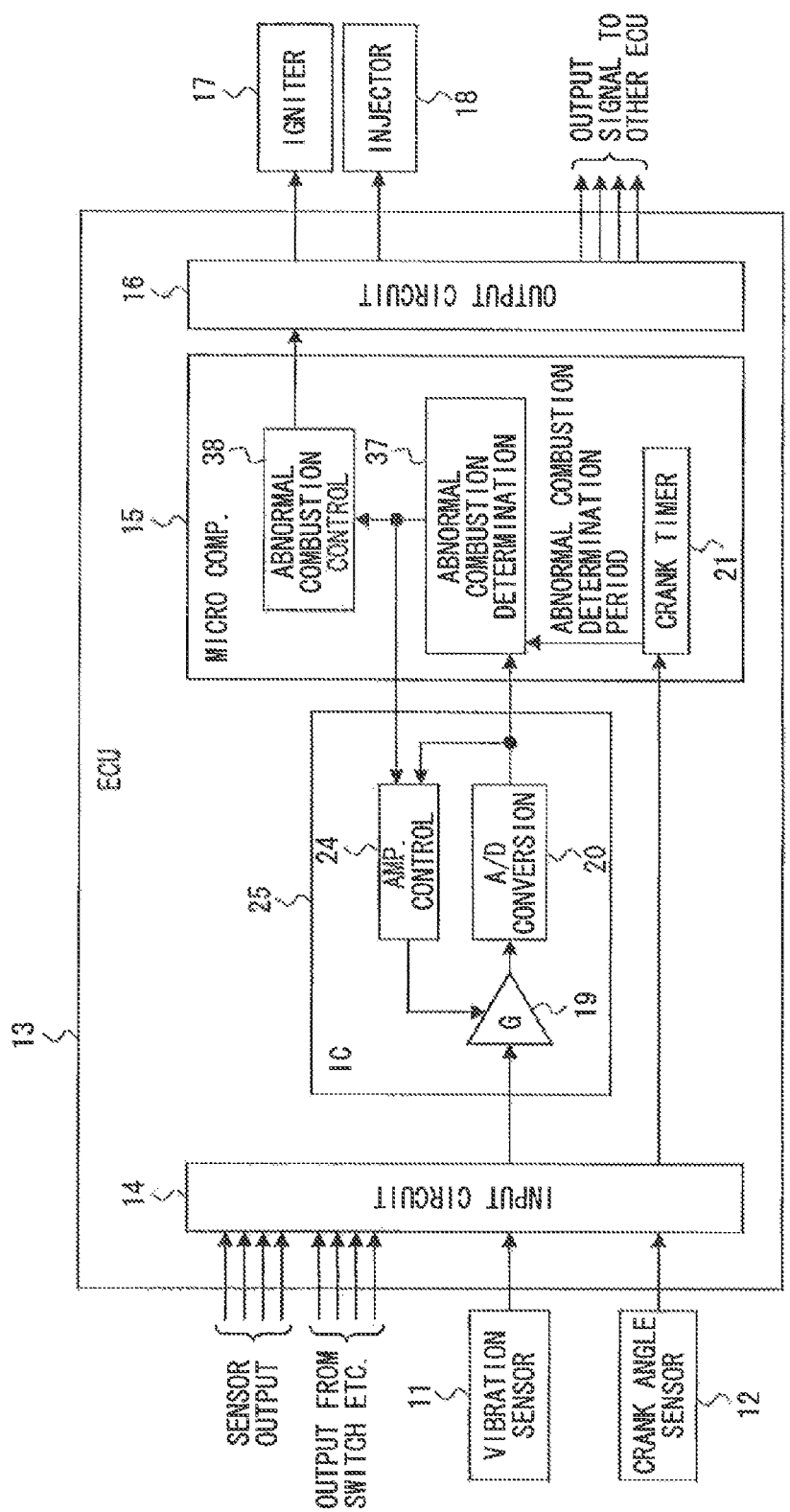
FIG. 13 is a block diagram of the engine control system in a ninth embodiment.
Figure 14:
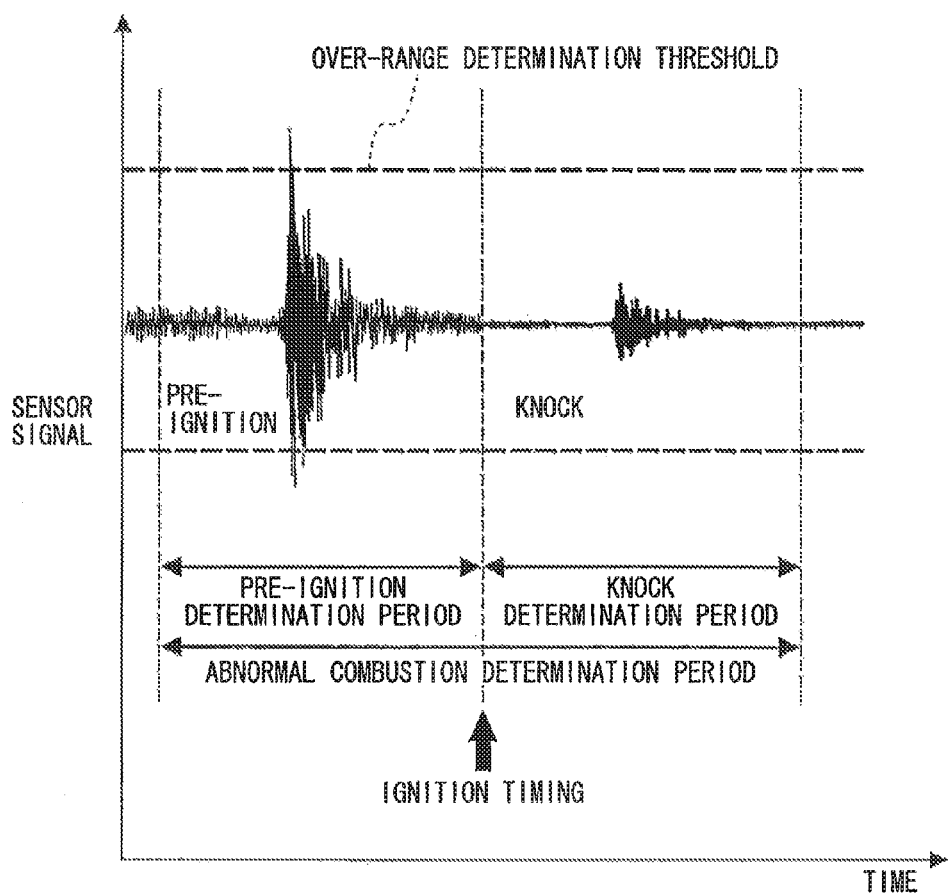
FIG. 14 is an illustration of an abnormal combustion determination period of the ninth embodiment.

The ninth embodiment of the present disclosure is described with reference to FIG. 13 to FIG. 16 in the following, With reference to FIG. 13, in the present embodiment, based on an output signal from the crank angle sensor 12, the crank timer 21 generates an abnormal combustion determination period signal, which represents a predetermined abnormal combustion determination period in which an abnormal combustion may occur. With reference to FIG. 14, the abnormal combustion determination period is a period that includes both a pre-ignition determination period (i.e., a period in which a pre-ignition may occur) and a knock determination period. In general, a pre-ignition is caused before the ignition timing. Therefore, the pre-ignition determination period is set before the ignition timing (i.e., set on a timing advance side of the ignition timing). In addition, a knock is generally caused after the ignition timing. Therefore, the knock determination period is set after the ignition timing (i.e., set on a timing retardation side of the ignition timing).

An abnormal combustion determination unit 37 (i.e., an abnormal combustion detector in claims) determines whether an abnormal combustion (i.e., a knock or a pre-ignition) has occurred based on characteristics of a waveform of the sensor signal from the A/D conversion unit 20 for the abnormal combustion determination period, and inputs the determination result to an abnormal combustion control unit 38 and to the amplification control unit 24.

As shown in FIG. 14, the abnormal combustion determination unit 37 detects a pattern of the waveform of the sensor signal in the pre-ignition determination period, and compares the pattern with a pre-stored pattern of a waveform of a pre-ignition for determining whether a pre-ignition was generated. The abnormal combustion determination unit 37 also detects a pattern of the waveform of the sensor signal in the knock determination period, and compares the pattern with a pre-stored pattern of a waveform of a knock for determining whether a knock was generated.

In such manner, an abnormal combustion (i.e., a knock and a pre-ignition) is accurately distinguished from a noise, and an accurate abnormal combustion determination is enabled.

Figure 15A:
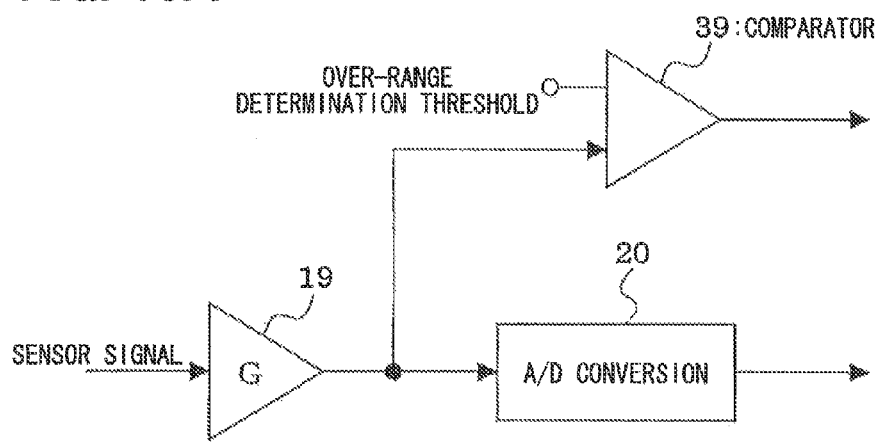
FIGS. 15A/B are illustrations of a determination method of pre-ignition of the ninth embodiment.

With reference to FIG. 15A, a comparator 39 may compare an input signal of the A/D conversion unit 20 (i.e., a sensor signal output from the variable amplifier 19) with a predetermined over-range determination threshold to determine that a pre-ignition has occurred when the input signal of the A/D conversion unit 20 exceeds the over-range determination threshold. In such case, the over-range determination threshold may be set to 4.5 V if an operation range of the A/D conversion unit 20 is between 0 V and 5.0 V.

Figure 15B:
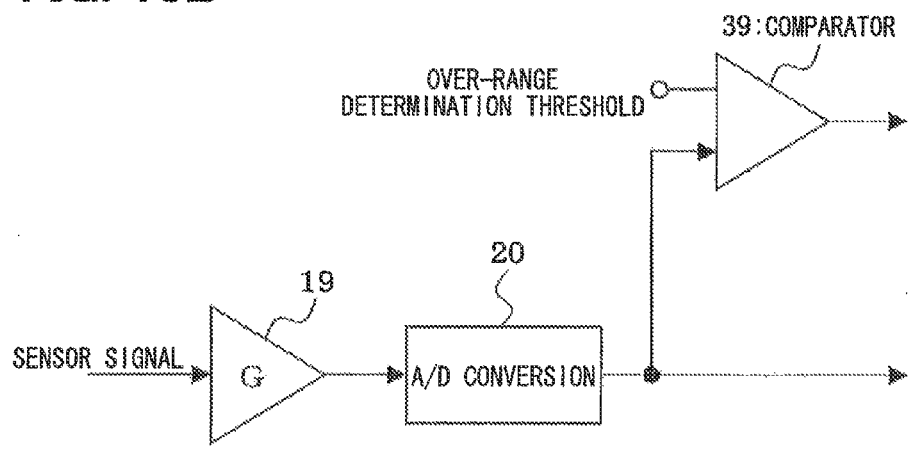

Alternatively, as shown in FIG. 15B, the comparator 39 may compare an output signal of the A/D conversion unit 20 (i.e., a sensor signal output from the A/D conversion unit 20) with the over-range determination threshold, and may determine that a pre-ignition has occurred when the output signal of the A/D conversion unit 20 exceeds the over-range determination threshold.

In general, the vibration caused by the pre-ignition is far larger than the vibration caused by the knock, and a large pre-ignition may be caused without any prior sign or any prelude. Therefore, even when the present disclosure is applied, the over-range may be caused.

However, even when such over-range occurs, the determination of the pre-ignition is enabled if the over-range determination is being performed. That is, a large pre-ignition can simply be detected by the determination of the amplitude only (i.e., the over-range determination) without examining the wave form pattern, since the amplitude of the large pre-ignition is very large. Further, since the pre-ignition may lead to a breakage of the engine, it is advantageous to securely detect such pre-ignition.

The abnormal combustion control unit 38 performs a pre-ignition prevention control for preventing a pre-ignition by changing an air-fuel ratio when the abnormal combustion determination unit 37 determines that a pre-ignition has occurred. The abnormal combustion control unit 38 also performs a knock prevention control for preventing a knock by retarding the ignition timing when the abnormal combustion determination unit 37 determines that a knock was generated.

The amplification control unit 24 sets an amplification power of the variable amplifier 19 based on an amplitude of the sensor signal from the A/D conversion unit 20 for a current abnormal combustion determination period (i.e., in one abnormal combustion determination period) and the abnormal combustion determination result for the current abnormal combustion determination period. The amplification control unit 24 switches the amplification power of the variable amplifier 19 in a period that is outside of the abnormal combustion determination period (i.e., after the current abnormal combustion determination period), and the variable amplifier 19 uses the switched amplification power switched by the amplification control unit 24 until the end of a subsequent abnormal combustion determination period.

In such manner, the amplification power can be changed (i.e., switched) in a period outside of the abnormal combustion determination period, thereby preventing an overlapping of a noise on the sensor signal caused by the switching of the amplification powers in the abnormal combustion determination period. Further, the amplification power setting is performed based on the information from one abnormal combustion determination period, quickly reflecting an influence of the change of the engine operation state, thereby enabling a quick adjustment of the amplification power even when the engine operation state drastically/steeply changes.

Further, a configuration of the amplification control unit 24 may be changed in a practical manner, to use the one in one of the first to eighth embodiments.

With reference to FIG. 16, when the peak value Dp of the sensor signal for the current abnormal combustion determination period exceeds the upper threshold Dthh (i.e., "Excessive") and the abnormal combustion determination unit 37 determines no abnormal combustion has occurred (i.e., none of a knock or a pre-ignition was detected), the saturation of the output of the variable amplifier 19 is prevented by decreasing the amplification power from G to G/2 (G=G/2). In such manner, a false determination of the abnormal combustion due to the saturation of the output of the variable amplifier 19 is prevented, and the accuracy of the abnormal combustion determination is improved.

When the peak value Dp of the sensor signal for the current abnormal combustion determination period exceeds the upper threshold Dthh (i.e., "Excessive"), but the abnormal combustion determination unit 37 determines that an abnormal combustion has occurred (i.e., at least one of a knock and a pre-ignition was detected), the amplification power G is kept as it is (G=G).

When the peak value Dp of the sensor signal in the current abnormal combustion determination period is in an "Appropriate" range between the lower threshold Dthl and the upper threshold Dthh (Dthl≤Dp<Dthh), the amplification power G is determined to be appropriate, and the same value of the amplification power G is used in a subsequent period (G=G).

When it is determined that the peak value Dp of the sensor signal falls below the lower threshold Dthl (i.e., "Too Small") and the abnormal combustion determination unit 37 determines that an abnormal combustion has occurred (i.e., at least one of a knock and a pre-ignition was detected), the amplification power is increased from G to 2G for the improvement of the resolution of the subsequent abnormal combustion determination period (G=2×G). In such manner, the amplification power is increased to have a value range that will not lead to the saturation of the output signal from the variable amplifier 19, thereby improving the abnormal combustion determination accuracy.

When the peak value Dp of the sensor signal in the current the abnormal combustion determination period is smaller than the lower threshold Dthl (i.e., "Too Small"), but the abnormal combustion determination unit 37 determines that an abnormal combustion has not occurred (i.e., none of a knock or a pre-ignition was detected), the amplification power G is kept as it is (G=G).

Further, in the same manner in the present embodiment as the other embodiment (i.e., the first to the eighth) described above, the amplification power of the variable amplifier 19 may be set based on the peak value Dp of the sensor signal and the knock determination result for the knock determination period regardless of a pre-ignition determination result as shown in FIG. 3. In such manner, the knock determination accuracy is further improved.

According to the present embodiment, the amplification power of the variable amplifier 19 is set based on the amplitude of the sensor signal and the abnormal combustion determination result for the abnormal combustion determination period. Therefore, an appropriate amplification power of the variable amplifier 19 is set in advance based on the estimation of the sensor signal amplitude range for the subsequent knock determination period, thereby enabling a quick adjustment of the amplification power even when the amplitude of the sensor signal is steeply changed. In such manner, while preventing the saturation of the output signal from the variable amplifier 19, the small abnormal combustion is accurately detected and the improved determination accuracy of the abnormal combustion is achieved.

(Tenth Embodiment)

Figure 17:
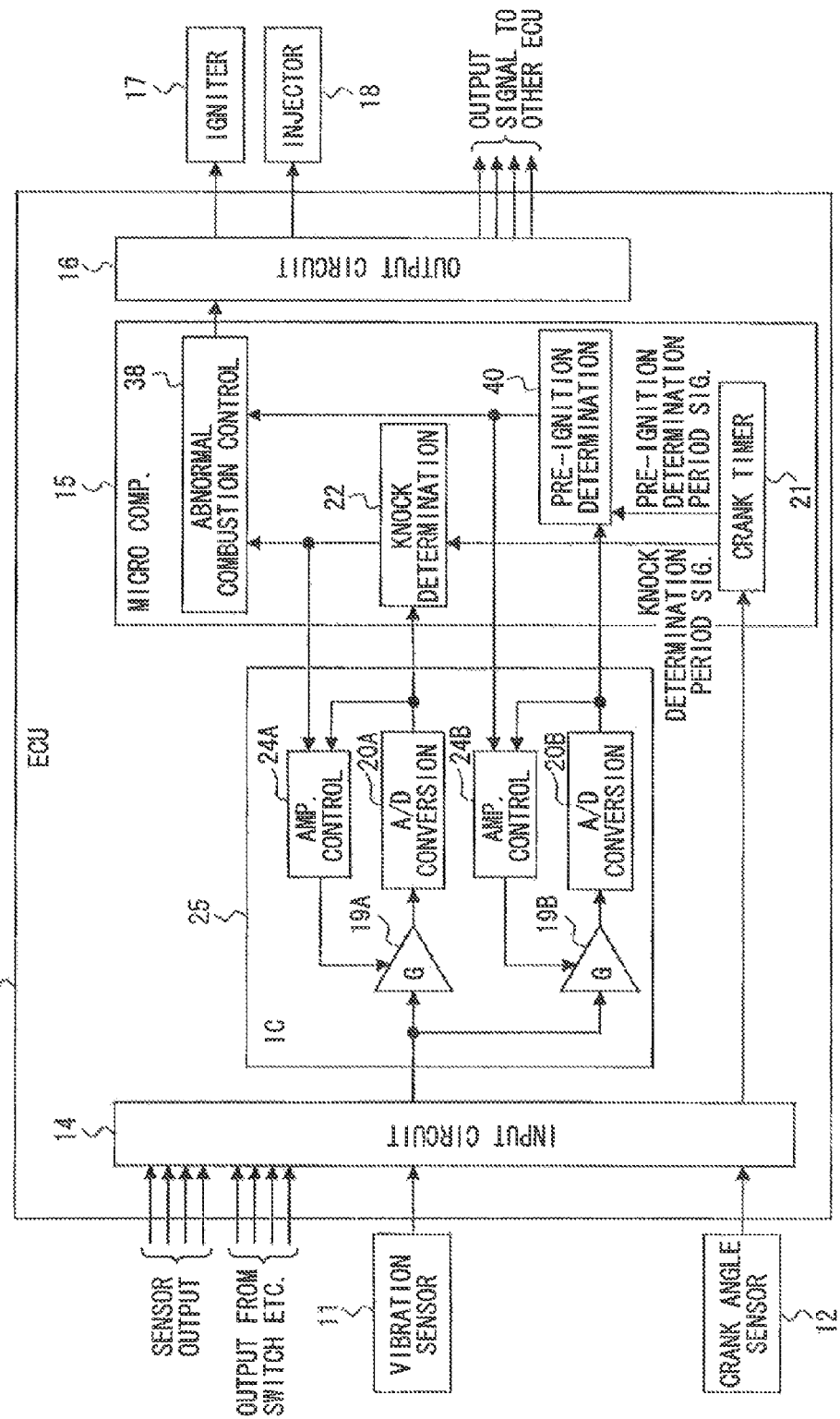
FIG. 17 is a block diagram of the engine control system in a tenth embodiment.

With reference to FIG. 17, in the tenth embodiment different (i.e., separate) uses a variable amplifier 19A for a knock determination period and uses a variable amplifier 19B for a pre-ignition determination period. Therefore, an amplification power for the variable amplifier 19A is set for knock determination and an amplification power for the variable amplifier 19B is set for pre-ignition determination.

Based on an output signal of the crank corner sensor 12, the crank timer 21 generates a knock determination period signal representing a predetermined knock determination period and a pre-ignition determination period signal representing a predetermined pre-ignition determination period.

Based on characteristics of a waveform (e.g., based on a wave form pattern) of the sensor signal from, a A/D conversion unit 20A, the knock determination unit 22 (i.e., an abnormal combustion detector in claims) determines whether a knock was generated during the knock determination period. The knock determination unit 22 inputs the determination result to the abnormal combustion control unit 38 and an amplification control unit 24A.

Similarly, based on characteristics of a waveform (e.g., based on a wave form pattern) of the sensor signal from a A/D conversion unit 20B, a pre-ignition determination unit 40 (i.e., an abnormal combustion detector in claims) determines whether a pre-ignition occurred during the pre-ignition determination period, and inputs the determination result to the abnormal combustion control unit 38 and an amplification control unit 24B.

Further, for knock determination, the amplification control unit 24A sets the amplification power of the variable amplifier 19A based on the amplitude of the sensor signal from the A/D conversion unit 20A and the knock determination result for the current knock determination period (i.e., one knock determination period), and switches the amplification power of the, variable amplifier 19A for knock determination in a period outside of the knock determination period (i.e., after the current knock determination period).

On the other hand, for pre-ignition determination, the amplification control unit 24B sets the amplification power of the variable amplifier 19B based on the amplitude of the sensor signal from the A/D conversion unit 20B and the pre-ignition determination result for the current pre-ignition determination period (i.e., one pre-ignition determination period), and switches the amplification power of the variable amplifier 19B for pre-ignition determination in a period outside of the pre-ignition determination period (i.e., after the current pre-ignition determination period).

Further, configuration of the amplification control units 24A, 248 may be changed in a practical manner to use the one in one of the above-described first to eighth embodiments.

According to the present embodiment, the amplification power of the variable amplifier 19A for a knock determination period and the amplification power of the variable amplifier 19B for a pre-ignition determination period are separately set. Therefore, the amplification power of the variable amplifier 19A and the amplification power of the variable amplifier 19B are respectively set to have appropriate values. In such manner, the knock determination accuracy and the pre-ignition determination accuracy are improved at the same time without compromise, for the still higher achievement of effectiveness.

Based on the present disclosure, the amplification control unit may set the amplification power of the variable amplifier based on the amplitude of the sensor signal and the determination result of the abnormal combustion for one abnormal combustion determination period.

Based on the information from one abnormal combustion determination period, that is, the amplitude of the sensor signal and the determination result of the abnormal combustion, an influence of the change of the operation state of the internal combustion engine is quickly reflected to the change/switching of the amplification power of the amplifier.

Further, the amplification control unit may include the comparator for comparing the amplitude of the sensor signal with a preset threshold, and the amplification control unit may set a higher amplification power of the sensor signal amplifier when the abnormal combustion detector determines that the abnormal combustion has occurred in a current abnormal combustion determination period and the amplitude of the sensor signal does not exceed the threshold. In such case, the higher amplification power is higher than the amplification power in the current abnormal combustion determination period.

In such manner, the amplification power is increased in a range (i.e., to a level) that does not lead to the saturation of the output signal of the sensor signal amplifier. Therefore, the accuracy of the abnormal combustion determination is improved.

Further, the amplification control unit may set a lower amplification power of the sensor signal amplifier when the abnormal combustion detector determines that an abnormal combustion has not occurred in a current abnormal combustion determination period and the amplitude of the sensor signal exceeds the threshold. In such case, the lower amplification power is lower than the amplification power in the current abnormal combustion determination period.

In such manner, a false determination of the abnormal combustion due to the saturation of the output signal of the sensor signal amplifier is prevented. Therefore, the accuracy of the abnormal combustion determination is improved.

Further, the amplification control unit may determine whether the amplitude of the sensor signal exceeds the preset threshold by detecting a peak value of the sensor signal in the abnormal combustion determination period and comparing the peak value of the sensor signal with the threshold.

In such manner, a comparison process for comparing the amplitude of the sensor signal with the threshold needs not be regularly performed. In other words, the peak value of the sensor signal is compared with the threshold only once, for the detection of the excessive amplitude of the sensor signal in the abnormal combustion determination period. Therefore, the required, specification of the comparator is eased, thereby reducing the cost of the device.

Although the current disclosure has been fully described in connection with the preferred embodiment thereof with reference to the accompanying drawings, it is to be noted that various changes and modifications will become apparent to those skilled in the art.

For instance, an idea of the present disclosure exemplified as an abnormal combustion determination system in the first to tenth embodiments, which determines the abnormal combustion (i.e., a knock and a pre-ignition) based on the output signal from the vibration sensor 11, may be modified to realize a similar system, which determines the abnormal combustion (i.e., a knock and a pre-ignition) based on the output signal from an in-cylinder pressure sensor for detecting an in-cylinder pressure.

Such changes and modifications are to be understood as being within the scope of the current disclosure as defined by the appended claims.

What is claimed is:

1. An electronic control unit for use with an internal combustion engine, the electronic control unit comprising:
   a sensor sensing one of a vibration and an in-cylinder pressure of the internal combustion engine;
   a sensor signal amplifier amplifying a sensor signal from the sensor by changing an amplification power of the sensor signal;
   an A/D converter converting the sensor signal amplified by the sensor signal amplifier to a digital signal;
   an abnormal combustion detector determining whether an abnormal combustion has occurred based on a characteristic of a waveform of the digital signal from the A/D converter;
   an abnormal combustion controller performing an abnormal combustion prevention control to prevent the abnormal combustion when the abnormal combustion detector determines that the abnormal combustion has occurred; and
   an amplification controller setting the amplification power of the sensor signal amplifier based on an amplitude of the digital signal from the A/D converter and a determination result of the abnormal combustion by the abnormal combustion detector.

2. The electronic control unit of claim 1, wherein the abnormal combustion detector detects, as the characteristic of the waveform of the sensor signal, a pattern of the waveform of the digital signal for an abnormal combustion determination period.

3. The electronic control unit of claim 1, wherein
   the amplification controller switches the amplification power of the sensor signal amplifier in a period outside of an abnormal combustion determination period, and
   the sensor signal amplifier uses the amplification power switched by the amplification controller until an end of a subsequent abnormal combustion determination period.

4. The electronic control unit of claim 3, wherein the A/D converter is a $\Delta\Sigma$ type A/D conversion device.

5. The electronic control unit of claim 1, wherein the amplification controller sets the amplification power of the sensor signal amplifier based on an amplitude of the digital signal and the determination result of the abnormal combustion for one abnormal combustion determination period.

6. The electronic control unit of claim 1, wherein
   the amplification controller includes a comparator for comparing an amplitude of the digital signal with a preset threshold, and
   the amplification controller sets a higher amplification power of the sensor signal amplifier, the higher amplification power is higher than the amplification power for a current abnormal combustion determination period, when the abnormal combustion detector determines that the abnormal combustion has occurred in the current abnormal combustion determination period and the amplitude of the digital signal does not exceed the threshold.

7. The electronic control unit of claim 6, wherein
   the amplification controller determines whether the amplification of the digital signal exceeds the preset threshold by detecting a peak value of the digital signal in the abnormal combustion determination period and comparing the peak value of the digital signal with the preset threshold.

8. The electronic control unit of claim 6, wherein the comparator is implemented as a comparator device.

9. The electronic control unit of claim 1, wherein
   the amplification controller includes a comparator for comparing the amplitude of the digital signal with a preset threshold, and
   the amplification controller sets a lower amplification power of the sensor signal amplifier, the lower amplification power is lower than the amplification power for a current abnormal combustion determination period, when the abnormal combustion detector determines that the abnormal combustion has not occurred in the current abnormal combustion determination period and the amplitude of the digital signal exceeds the threshold.

10. The electronic control unit of claim 9, wherein
    the amplification controller determines whether the amplification of the digital signal exceeds the preset threshold by detecting a peak value of the digital signal in the abnormal combustion determination period and comparing the peak value of the digital signal with the preset threshold.

11. The electronic control unit of claim 9, wherein the comparator is implemented as a comparator device.

12. The electronic control unit of claim 1, wherein the amplification controller is implemented as a software performed by a microcomputer.

13. The electronic control unit of claim 1, wherein the amplification controller is implemented as a software performed by a microcomputer and a dedicated circuit.

14. The electronic control unit of claim 1, wherein the amplification controller is implemented as a dedicated circuit.

15. The electronic control unit of claim 14, wherein the dedicated circuit is provided as an external circuit of the microcomputer.

16. The electronic control unit of claim 14, wherein the dedicated circuit is provided in the microcomputer.

17. The electronic control unit of claim 1, wherein the sensor signal amplifier is provided as an external part of a microcomputer.

18. The electronic control unit of claim 1, wherein the sensor signal amplifier is provided in a microcomputer.

19. The electronic control unit of claim 1, wherein the A/D converter is provided as an external part of a microcomputer.

20. The electronic control unit of claim 1, wherein the A/D converter is provided in a microcomputer.

* * * * *